(12) United States Patent
Doyle et al.

(10) Patent No.: US 11,579,636 B2
(45) Date of Patent: Feb. 14, 2023

(54) SYSTEMS AND METHODS FOR CONTROLLING OPERATIONS OF MULTI-MANIFOLD FLUID DISTRIBUTION SYSTEMS

(71) Applicant: Hayward Industries, Inc., Berkeley Heights, NJ (US)

(72) Inventors: Kevin Doyle, Pompano Beach, FL (US); William Weiss, Parkland, FL (US)

(73) Assignee: Hayward Industries, Inc., Berkeley Heights, NJ (US)

( * ) Notice: Subject to any disclaimer, the term of this patent is extended or adjusted under 35 U.S.C. 154(b) by 0 days.

(21) Appl. No.: 17/324,079

(22) Filed: May 18, 2021

(65) Prior Publication Data
US 2022/0341204 A1  Oct. 27, 2022

Related U.S. Application Data

(60) Provisional application No. 63/178,508, filed on Apr. 22, 2021, provisional application No. 63/178,526, filed on Apr. 22, 2021.

(51) Int. Cl.
*G05D 7/06* (2006.01)
*G05B 13/04* (2006.01)
(Continued)

(52) U.S. Cl.
CPC ......... *G05D 7/0623* (2013.01); *E04H 4/1245* (2013.01); *F16K 31/02* (2013.01);
(Continued)

(58) Field of Classification Search
CPC .... G05D 7/0623; G05D 7/0676; G05B 15/02; E04H 4/1245; F16K 31/02
(Continued)

(56) References Cited

U.S. PATENT DOCUMENTS 3,157,597 A    11/1964  Burba
4,404,861 A     9/1983  Wass
(Continued)

FOREIGN PATENT DOCUMENTS

AU    2006200701 A1    9/2006
CA       2614643 C     11/2009
(Continued)

OTHER PUBLICATIONS

Mathieu Martin, Direct Simulation Based Model-Predictive Control of Flow Maldistribution in Paralle Microchannels, Oct. 8, 2009, Journal of Fluids Engineering by ASME, vol. 131 (Year: 2009).*

(Continued)

*Primary Examiner* — Rocio Del Mar Perez-Velez
*Assistant Examiner* — Christopher W Carter
(74) *Attorney, Agent, or Firm* — McCarter & English, LLP

(57) ABSTRACT

A system and method for controlling operations of a fluid distribution may include a first manifold receiving a next mode of operation for the fluid distribution system. The first manifold may calculate first and second flow requirements for the first and second manifolds that may respectively include a first and second total flowrates from the first and second manifolds. The first manifold may determine required operation states for valves of the first manifold and the second manifold for the next mode based on the first and second flow requirements. The first manifold may be controllably operated to cause the second manifold and a supply device of the fluid distribution system to operate in the required operation states and provide first and second flow requirements. The first manifold may direct the second manifold to independently balance individual outlet flowrates of the second manifold while continuing to provide the second flow requirements.

20 Claims, 14 Drawing Sheets

(51) Int. Cl.
  *E04H 4/12* (2006.01)
  *F16K 31/02* (2006.01)
  *G05B 13/02* (2006.01)
  *G05B 19/418* (2006.01)
  *G05B 23/02* (2006.01)
  *G05B 15/02* (2006.01)

(52) U.S. Cl.
  CPC ........... *G05B 13/02* (2013.01); *G05B 13/042* (2013.01); *G05B 19/41865* (2013.01); *G05B 23/0294* (2013.01); *G05D 7/0635* (2013.01); *G05D 7/0652* (2013.01); *G05D 7/0676* (2013.01); *G05B 15/02* (2013.01)

(58) Field of Classification Search
  USPC .......................................................... 700/19
  See application file for complete search history.

(56) References Cited

U.S. PATENT DOCUMENTS

| | | |
|---|---|---|
| 4,465,593 A | 8/1984 | Wemhoff |
| 4,789,132 A | 12/1988 | Fujita et al. |
| 4,838,483 A | 6/1989 | Nurczyk et al. |
| 4,948,091 A | 8/1990 | Satoh et al. |
| 5,287,567 A | 2/1994 | Eash et al. |
| 5,422,014 A | 6/1995 | Allen et al. |
| 5,566,717 A | 10/1996 | Robert |
| 5,669,221 A | 9/1997 | LeBleu et al. |
| 5,979,493 A | 11/1999 | Simpkins, Jr. |
| 6,058,718 A | 5/2000 | Forsberg et al. |
| 6,227,223 B1 | 5/2001 | Crochet et al. |
| 6,230,558 B1 | 5/2001 | Miwa et al. |
| 6,279,177 B1 | 8/2001 | Gloodt |
| 6,487,919 B1 | 12/2002 | Edwards |
| 6,557,777 B1 | 5/2003 | Pevnick |
| 6,913,203 B2 | 7/2005 | DeLangis |
| 7,373,787 B2 | 5/2008 | Forsberg et al. |
| 7,681,436 B2 | 3/2010 | Biberger |
| 7,815,396 B2 | 10/2010 | McFarland et al. |
| 7,854,597 B2 | 12/2010 | Stiles, Jr. et al. |
| 7,942,071 B2 | 5/2011 | Claisse et al. |
| 8,281,647 B2 | 10/2012 | Boutet et al. |
| 8,459,100 B2 | 6/2013 | Biberger |
| 8,600,566 B1 | 12/2013 | Longo et al. |
| 8,606,413 B2 | 12/2013 | Picton |
| 8,833,405 B2 | 9/2014 | Phallen et al. |
| 9,241,604 B2 | 1/2016 | Dries |
| 9,470,336 B2 | 10/2016 | Huffington et al. |
| 9,581,478 B1 | 2/2017 | Smith |
| 9,670,918 B2 | 6/2017 | Mueller |
| 9,695,954 B2 | 7/2017 | Da Pont et al. |
| 9,777,733 B2 | 10/2017 | Stiles, Jr. et al. |
| 9,857,805 B2 | 1/2018 | Halimi |
| 9,938,741 B1 | 4/2018 | Goettl |
| 10,253,515 B2 | 4/2019 | Rejniak et al. |
| 10,261,523 B2 | 4/2019 | Khabbaz et al. |
| 10,452,061 B2 | 10/2019 | Yenni et al. |
| 10,487,813 B2 | 11/2019 | Mueller |
| 10,508,423 B2 | 12/2019 | Herbert et al. |
| 10,508,753 B2 | 12/2019 | Ravedati et al. |
| 10,514,172 B2 | 12/2019 | Acker |
| 10,538,979 B2 | 1/2020 | Jones et al. |
| 10,663,959 B2 | 5/2020 | Yenni et al. |
| 10,883,730 B2 | 1/2021 | Wang et al. |
| 10,901,438 B2 | 1/2021 | Klein et al. |
| 10,918,569 B2 | 2/2021 | Collins et al. |
| 11,041,579 B2 | 6/2021 | Lopez et al. |
| 11,061,392 B2 | 7/2021 | Yenni et al. |
| 11,122,669 B2 | 9/2021 | Potucek et al. |
| 11,137,780 B1 | 10/2021 | Doyle et al. |
| 11,204,106 B1 | 12/2021 | Doyle et al. |
| 11,208,822 B2 | 12/2021 | Doan et al. |
| 11,215,175 B2 | 1/2022 | Doan et al. |
| 11,221,637 B1 | 1/2022 | Doan et al. |
| 11,307,600 B2 | 4/2022 | Doan et al. |
| 2002/0029804 A1 | 3/2002 | Liorati et al. |
| 2002/0069646 A1* | 6/2002 | Yeung .................... B64D 13/00 60/783 |
| 2004/0215778 A1* | 10/2004 | Hesse ................... H04L 69/329 709/226 |
| 2005/0081642 A1 | 4/2005 | Nehl et al. |
| 2005/0119766 A1 | 6/2005 | Amundson |
| 2005/0217260 A1 | 10/2005 | Desjardins et al. |
| 2006/0168611 A1 | 7/2006 | Fima |
| 2006/0283789 A1 | 12/2006 | Kadlec et al. |
| 2007/0034644 A1 | 2/2007 | Bertucci et al. |
| 2007/0114162 A1 | 5/2007 | Stiles et al. |
| 2008/0087330 A1 | 4/2008 | Burlage et al. |
| 2008/0148471 A1 | 6/2008 | Tatum |
| 2008/0168599 A1 | 7/2008 | Caudill et al. |
| 2009/0078038 A1 | 3/2009 | Ushigusa et al. |
| 2009/0151801 A1 | 6/2009 | Gorman et al. |
| 2009/0204263 A1 | 8/2009 | Love |
| 2010/0018911 A1 | 1/2010 | Vanzeeland |
| 2010/0032492 A1 | 2/2010 | Grimm et al. |
| 2010/0071800 A1* | 3/2010 | Kohler ................ A01G 13/0237 141/1 |
| 2010/0200475 A1 | 8/2010 | Kwon |
| 2010/0237608 A1 | 9/2010 | Mosher |
| 2010/0300213 A1 | 12/2010 | Fink et al. |
| 2010/0300548 A1 | 12/2010 | DeVerse |
| 2011/0083748 A1 | 4/2011 | Ellis et al. |
| 2011/0130976 A1 | 6/2011 | Lamberti et al. |
| 2011/0197977 A1 | 8/2011 | Henderson |
| 2011/0265883 A1* | 11/2011 | Cruse .................. H01J 37/3244 137/8 |
| 2012/0017367 A1 | 1/2012 | Reeder et al. |
| 2012/0192583 A1 | 8/2012 | Lifson et al. |
| 2013/0319535 A1 | 12/2013 | Boger et al. |
| 2014/0130487 A1 | 5/2014 | Akiyama et al. |
| 2014/0130878 A1 | 5/2014 | Marinez |
| 2014/0165719 A1 | 6/2014 | Williamson et al. |
| 2014/0183957 A1 | 7/2014 | Duchesneau |
| 2014/0230925 A1 | 8/2014 | Halimi |
| 2014/0262998 A1 | 9/2014 | Wagner et al. |
| 2014/0277772 A1 | 9/2014 | Lopez et al. |
| 2014/0303757 A1 | 10/2014 | Pruchniewski et al. |
| 2014/0314062 A1 | 10/2014 | Loebs |
| 2015/0153744 A1 | 6/2015 | Didion |
| 2015/0159503 A1 | 6/2015 | Leininger et al. |
| 2015/0292985 A1 | 10/2015 | Yenni et al. |
| 2015/0315803 A1 | 11/2015 | Hamza et al. |
| 2015/0319941 A1 | 11/2015 | Klein |
| 2016/0077530 A1 | 3/2016 | Moran et al. |
| 2016/0077531 A1 | 3/2016 | Kucera et al. |
| 2016/0238668 A1 | 8/2016 | Cordray et al. |
| 2016/0290524 A1 | 10/2016 | Ferraz |
| 2017/0027410 A1 | 2/2017 | Stoyanov et al. |
| 2017/0053360 A1 | 2/2017 | Loeb et al. |
| 2017/0070842 A1 | 3/2017 | Kulp |
| 2017/0190602 A1 | 7/2017 | Porat et al. |
| 2017/0211711 A1 | 7/2017 | Ritter et al. |
| 2018/0039236 A1 | 2/2018 | Acosta Gonzalez |
| 2018/0087938 A1 | 3/2018 | Neilson et al. |
| 2018/0113481 A1* | 4/2018 | Faiczak ................ G05D 7/0688 |
| 2018/0143052 A1* | 5/2018 | Xie .......................... E21B 49/08 |
| 2018/0148912 A1 | 5/2018 | Park |
| 2018/0359969 A1 | 12/2018 | Millar |
| 2018/0364654 A1* | 12/2018 | Locke ...................... F24F 11/63 |
| 2019/0024943 A1 | 1/2019 | Scott et al. |
| 2019/0277119 A1 | 9/2019 | Campion |
| 2019/0286172 A1 | 9/2019 | O'Dell et al. |
| 2019/0314243 A1 | 10/2019 | MacCallum et al. |
| 2019/0320626 A1 | 10/2019 | Wang et al. |
| 2019/0368620 A1 | 12/2019 | Masen et al. |
| 2020/0070796 A1 | 3/2020 | Braatz et al. |
| 2020/0122185 A1 | 4/2020 | Carriere et al. |
| 2020/0123952 A1 | 4/2020 | DeHart et al. |
| 2020/0182236 A1 | 6/2020 | Beisel et al. |
| 2020/0201365 A1 | 6/2020 | Shimizu et al. |
| 2021/0011500 A1 | 1/2021 | Halimi et al. |
| 2021/0039129 A1 | 2/2021 | Bolan et al. |
| 2021/0283724 A1 | 9/2021 | Dessart et al. |

(56) References Cited

U.S. PATENT DOCUMENTS

| | | |
|---|---|---|
| 2021/0298557 A1 | 9/2021 | Budampati et al. |
| 2021/0300804 A1 | 9/2021 | Broga et al. |
| 2021/0301985 A1 | 9/2021 | Brown et al. |
| 2021/0309539 A1 | 10/2021 | Budampati et al. |
| 2021/0324649 A1 | 10/2021 | Revilla et al. |
| 2022/0113749 A1 | 4/2022 | Doan et al. |
| 2022/0125677 A1 | 4/2022 | Doan et al. |

FOREIGN PATENT DOCUMENTS

| | | |
|---|---|---|
| CN | 204225208 U | 3/2015 |
| CN | 104879534 A | 9/2015 |
| CN | 106641422 A | 5/2017 |
| DE | 102014006511 A1 | 11/2015 |
| DE | 202016004416 U1 | 8/2017 |
| DE | 102014208261 B4 | 8/2020 |
| EP | 2306257 A1 | 4/2011 |
| FR | 2538834 A1 | 7/1984 |
| JP | H07158295 A | 6/1995 |
| WO | 2004/070242 A1 | 8/2004 |
| WO | 2020/120973 A2 | 6/2020 |
| WO | 2020/120974 A2 | 6/2020 |
| WO | 2020/120975 A2 | 6/2020 |
| WO | 2020/120977 A2 | 6/2020 |
| WO | 2020/160658 A1 | 8/2020 |
| WO | 2021/050932 A1 | 3/2021 |
| WO | 2021/091773 A1 | 5/2021 |

OTHER PUBLICATIONS

Jimmy C. K. Tong, Attainment of Flowrate Uniformity in the Channels That Link a Distribution Manifold to a Collection Manifold, Mar. 28, 2007, Fluids Engineering Division of ASME, vol. 129 (Year: 2007).*
Office Action dated Apr. 26, 2021, in connection with U.S. Appl. No. 17/185,926 (15 pages).
Office Action dated May 6, 2021, in connection with U.S. Appl. No. 17/185,897 (9 pages).
Examiner Interview Summary dated May 17, 2021, in connection with U.S. Appl. No. 17/185,897 (2 pages).
Notice of Allowance dated May 28, 2021, in connection with U.S. Appl. No. 17/185,897 (7 pages).
Examiner Interview Summary dated Jun. 2, 2021, in connection with U.S. Appl. No. 17/185,926 (2 pages).
Office Action dated Jul. 20, 2021, in connection with U.S. Appl. No. 17/324,064 (11 pages).
Notice of Allowance dated Aug. 11, 2021, in connection with U.S. Appl. No. 17/185,926 (7 pages).
Office Action dated Aug. 19, 2021, in connection with U.S. Appl. No. 17/324,069 (10 pages).
Interview Summary dated Sep. 15, 2021, in connection with U.S. Appl. No. 17/324,064 (2 pages).
Interview Summary dated Sep. 16, 2021, in connection with U.S. Appl. No. 17/324,069 (2 pages).
International Search Report and Written Opinion of the International Searching Authority dated Sep. 20, 2021, mailed in connection with International Application No. PCT/US2021/048117 (10 pages).
Office Action dated Sep. 21, 2021, in connection with U.S. Appl. No. 17/327,543 (15 pages).
Notice of Allowance dated Nov. 10, 2021, in connection with U.S. Appl. No. 17/324,064 (17 pages).
Corrected Notice of Allowability dated Nov. 24, 2021, in connection with U.S. Appl. No. 17/324,064 (5 pages).
Office Action dated Nov. 24, 2021, in connection with U.S. Appl. No. 17/327,488 (14 pages).
Notice of Allowance dated Mar. 9, 2022, in connection with U.S. Appl. No. 17/324,064 (17 pages).
Notice of Allowance dated Apr. 12, 2022, issued in connection with U.S. Appl. No. 17/324,064 (18 pages).
Office Action dated Apr. 14, 2022, in connection with U.S. Appl. No. 17/327,543 (11 pages).
Notice of Allowance dated Apr. 18, 2022, issued in connection with U.S. Appl. No. 17/324,069 (8 pages).
PCT International Search Report and Written Opinion of the International Searching Authority dated May 23, 2022, in connection with International Application No. PCT/US2022/017961 (10 pages).
Notice of Allowance dated Jun. 21, 2022, issued in connection with U.S. Appl. No. 17/324,064 (19 pages).
Notice of Allowance dated Jun. 23, 2022, issued in connection with U.S. Appl. No. 17/324,069 (7 pages).
Office Action dated Jun. 27, 2022, issued in connection with U.S. Appl. No. 17/327,488 (7 pages).
PCT Invitation to Pay Additional Fees dated Jul. 5, 2022, in connection with Int'l Application No. PCT/US2022/026027 (3 pages).
Notice of Allowance dated Jul. 11, 2022, issued in connection with U.S. Appl. No. 17/327,488 (5 pages).
Notice of Allowance dated Jul. 29, 2022, issued in connection with U.S. Appl. No. 17/327,543 (5 pages).
PCT International Search Report and Written Opinion dated Sep. 2, 2022, in connection with Int'l Application No. PCT/US2022/026027 (11 pages).
Notice of Allowance dated Sep. 29, 2022, issued in connection with U.S. Appl. No. 17/324,064 (20 pages).
Notice of Allowance dated Oct. 14, 2022, issued in connection with U.S. Appl. No. 17/327,543 (5 pages).
Notice of Allowance dated Oct. 19, 2022, issued in connection with U.S. Appl. No. 17/324,069 (7 pages).
Notice of Allowance dated Oct. 19, 2022, issued in connection with U.S. Appl. No. 17/327,488 (7 pages).
Office Action dated Oct. 11, 2022, issued in connection with U.S. Appl. No. 17/558,349 (13 pages).

* cited by examiner

SYSTEMS AND METHODS FOR CONTROLLING OPERATIONS OF MULTI-MANIFOLD FLUID DISTRIBUTION SYSTEMS

This application claims the benefit of priority under 35 U.S.C. § 119(c) to U.S. Provisional Patent Application No. 63/178,508 entitled "SYSTEMS AND METHODS FOR CONTROLLING OPERATIONS OF A FLUID HANDLING SYSTEM," filed Apr. 22, 2021, and to U.S. Provisional Patent Application No. 63/178,526 entitled "SYSTEMS AND METHODS FOR CONTROLLING CHLORINATION IN A FLUID HANDLING SYSTEM," filed Apr. 22, 2021, both of which are incorporated by reference in their entireties for all purposes.

This application is also related to the following co-pending applications, each of which is by Kevin Doyle and William Weiss, assigned to the assignee of the present application, and expressly incorporated by reference herein, in its respective entirety, for all purposes: U.S. patent application Ser. No. 17/324,064 filed on May 18, 2021, entitled "SYSTEMS AND METHODS FOR CONTROLLING OPERATIONS OF A FLUID DISTRIBUTION SYSTEM;" and U.S. patent application Ser. No. 17/324,069 filed on May 18, 2021, entitled "SYSTEMS AND METHODS FOR TURNING OVER FLUID DISTRIBUTION SYSTEMS."

BACKGROUND

Fluid distribution systems, such as those employed to manage pool operations, can include one or more fluid handling devices—pumps (e.g., single speed, multi-step, variable speed, etc.), filters, valves, various plumbing components, cleaning systems, heaters, water features (e.g., fountains, sprays, etc.), and/or other types. In these fluid distribution systems, multiple valves and/or supply devices (e.g., pumps, valve-controlled bypass fluid circuits, and other devices) may be used to convey and/or direct flow from, to, and within the various fluid handling devices.

However, providing and installing fluid distribution systems with increased numbers of fluid handling devices can be costly and require a lot of space. Many of those fluid handling devices may require their own valve piped into a fluid circuit to serve that device. In other fluid distribution systems, multiple fluid handling devices may incorporate one or more supply devices to increase or decrease volume and/or flowrates of fluid delivered to those fluid handling devices. Yet, incorporation of such valves and supply devices can present multiple challenges to highly responsive and precise operation of fluid distribution systems due to operational limitations of the valves and supply devices and the complexities of coordinated control of large numbers thereof.

Example valves can be manually actuated, provided with automatic actuators (e.g., electric motors), capable of being actuated to operate in multiple positions, or have a combination of these operational features. Multiple valves with controlled actuators may be needed to divert fluid flow to and from fluid handling devices and different fluid circuits within respective fluid distribution systems. However, current valve actuators are limited in their respective abilities to precisely set flowrates due to the small ranges of available settings provided by their respective designs. In the case of a fluid distribution system for a pool, for example, an installer is very limited in how valves can be setup because each of the fluid handling devices in the fluid distribution system may require flow be supplied at predefined flowrates.

Normal continuous operation and maintenance of fluid handling devices and the valves and supply devices they may need, can require complex multi-component control systems. Each employed valve or supply device may include its own controller, with is own set of unique protocols and operational sequences that must be implemented to control that valve or supply device to provide fluid to the fluid handling device that valve or supply device serves. Various control schemes may be required to operate valves and supply devices so that fluid is directed to different components at one of two or three preset specific flowrates required for proper operation. However, these control schemes are not nimble nor responsive to specific volume and/or flowrate requirements that may result from operations of other FHDs of a fluid distribution system. Controlling each valve and supply device in these fluid distribution systems requires timely (e.g., real-time) delivery and processing of accurate values of flow parameters (e.g., flowrate, volume, etc.) for the fluid flowing to and from each valve and supply device. Current fluid distribution systems do not have these capabilities.

Compounding the challenge of controlling multiple valves and supply devices, is the variability in operational conditions a fluid distribution system can experience. Many of these systems may be used daily with overall flowrates reducing or increasing depending on a state of a given system that is subject to external conditions that vary in magnitude/effect and timing. For the valves and supply devices to operate correctly, constantly, timely, and accurately, communication is required between fluid handling devices, system flow sensors, and controllers and control systems for the valves and supply devices. In addition, for overall operations of a fluid distribution system to meet sanitary, safety, minimum performance, and user-desired performance requirements, the controllers and control systems have to be able coordinate with one another to execute complex sequences of operations.

In addition to the above challenges, fluid distribution systems that are required to be turned over, often perform fluid turnover processes that are inexact and inefficient. In some examples turning over a fluid distribution system may generally involve operating one or more supply devices to cycle fluid through the fluid distribution system for some period of time. During these operating periods, some FHDs, such as those including water features, may be operated in reduced capacities as a way to prioritize cycling fluid through the fluid distribution system so that the fluid therein it is filtered, treated (e.g., chlorinated), and/or heated. However, the turnover operating procedures mentioned above are often performed at preset times and for preset durations that a fluid distribution system has no control to modify or are difficult for fluid distribution system administrators to change. Furthermore, these procedures: do not involve accurately tracking how much fluid is being cycled through the fluid distribution system; are not readily adjustable from the standpoint of how much volume will be cycled and/or when the turnover operation will occur; and do not account for usage levels (real-time or cumulative) of the fluid distribution system.

As a result of these deficiencies, current fluid distribution systems lack a self-regulating ability to adjust how much fluid is turned over (also referred to as a turnover level) and a schedule for turning over the fluid distribution system based on increases or decreases in system usage as these usage changes occur. As a further result of the deficiencies mentioned above, current fluid distribution systems do not perform turnover operations that optimize: (A) power consumption by supply devices; (B) volumes of chemicals used for treatment; (C) usage of heat or lack of heat provided by an environment surrounding a fluid distribution system in obtaining a desired system fluid temperature; or (D) run times of supply devices.

Still further issues are often present for fluid distribution systems that employ higher order numbers of FHDs, valves, as well as multiple supply devices. Control, even between controllers and control systems that each direct the operations of larger sub-groups of FHDs, valves, and supply devices is complicated, difficult to plan, and arduous to install and monitor operation thereof. Real-time adjustments to one FHD, valve, or supply device, can result in cascading adjustments being required to supply adequate fluid flow to other FHDs, valves, or supply devices. As a result, the fluid distribution system reaching a steady state after an adjustment of just one FHD, valve, or supply device may be delayed by each of the other FHDs, valves, or supply devices reaching respective steady states after series of operations that take time and a significant degree of coordination between controllers and separate control systems.

In addition to, and in some instances as a byproduct of, enacting adjustments slowly, the fluid distribution systems mentioned immediately above are prone to high levels of inefficiencies. In particular, switching between entire fluid distribution system operating modes comes with a number of drawbacks stemming from the fact that some if not all of FHDs, valves, and supply devices largely operate according to a small number of settings that are pre-selected for implementation during set periods of time. The controllers and control systems for these fluid distribution systems lack the ability to respond quickly or efficiently to changing conditions. Furthermore, any remedial measures taken by these systems do no bring about rapid returns to steady state operations for many of the FHDs, valves, and supply devices of the fluid distribution system, let alone the fluid distribution system as a whole.

As a result, a need exists for systems and methods that include the use of a manifold for directing operations of a fluid distribution system. In particular a need exists for systems and methods that involve controlling operations of valves of a manifold in tandem with controlling operations of supply devices to deliver fluid flows to different fluid handling devices at precisely specified flowrates.

Further, a need exists for systems and methods that include the use of a manifold for efficiently turning over fluid distribution systems. More specifically, a need exists for systems and methods: in which a total volume of fluid cycled through a fluid distribution system is volumetrically tracked by a manifold, and in which the manifold is configured to direct and control the flow of that volume of fluid by controlling its respective valves and supply devices for the fluid distribution system. In addition, a need exists for a manifold that directs a specific volume of fluid based on a current usage of a fluid distribution system the manifold controls a cycling of the volume of fluid therethrough.

Still further, a need exists for systems and methods for controlling operations of fluid distribution systems with multiple manifolds. More specifically, a need exists for a manifold that can control operations of other manifolds and supply devices in order to be able to quickly change operating modes of a fluid distribution system.

SUMMARY

Examples described herein include systems and methods for controlling operations of a fluid distribution system. In one example, a fluid distribution system may include a manifold with a manifold control system ("MCS"). The MCS may include a processor configured to receive device settings for fluid handling devices in fluid communication with the manifold. The processor may determine a target flow condition for the manifold based on the device settings; and the target flow condition may involve at least a first fluid flow from the manifold to a first fluid handling device. In one example, the processor may determine a first operation for the fluid distribution system to perform to obtain the target flow condition, based on: the target flow condition; a first flowrate of the first fluid flow; and an operational state of a supply device of the fluid distribution system.

According to an aspect of the present disclosure, a first valve of a manifold of a fluid distribution system may be in fluid communication with, and regulate a first fluid flow to, a first fluid handling device. In other aspects, a second valve of the manifold may be in fluid communication with a second fluid handling device, a reservoir, or a recirculation line. A processor for an MCS for the manifold may cause the fluid distribution system to perform a first operation until the manifold exhibits a target flow condition. In some examples, the first operation may include the processor controlling at least one of a supply device of the fluid distribution system, the first valve, and the second valve to change a first flowrate of the first fluid flow to the first fluid handling device. In other examples, at least one valve of the manifold may be continuously operated to maintain the target flow condition once obtained through the first operation.

In other examples, obtaining a target flow condition may include a processor for an MCS of a manifold determining a first differential between: (A) a first value of a first flowrate of a first fluid flow to a first fluid handling device before a first operation, and (B) a second value of the first flowrate corresponding to the target flow condition. A second differential may be determined between (A) a current total flowrate capacity of the manifold; and (B) a sum of the first differential and a current total flowrate for the manifold. In still further examples, a first operation a fluid distribution system may be performed until the manifold exhibits the target flow condition can include controlling, with the processor, a supply device for the fluid distribution system to maintain or modify a flowrate of a fluid supply to the manifold based on the second differential.

Examples described herein further include systems and methods for turning over a fluid distribution system including a manifold. In one example, the manifold can receive, with a respective processor, an operation schedule and an efficiency setting for the fluid distribution system and the processor can determine a turnover scheme. The turnover scheme can include a target turnover schedule of target turnover levels. In one example, each target turnover level can correspond to a volume of fluid to be cycled through the fluid distribution system over a predetermined period of time. A method for turning over the fluid distribution system can further include operating, with the processor, the manifold and at least one supply device of the fluid distribution system based on a target turnover level specified in the target turnover schedule corresponding to a current time.

According to another aspect of the present disclosure, a manifold may be in communication with a device, such as a computing device, that tracks a usage of a fluid distribution system. In one example, the manifold can receive a current usage from the device and determine a required turnover level corresponding to the current usage. In one example, the processor can determine a current turnover level based on a flowrate of fluid flow as detected by a flow sensor for at least one valve of the manifold. Further, the processor can determine an override status for a turnover scheme based on an efficiency setting and a comparison of the current turnover level, a current target turnover level, and the required turnover level. In one example, the processor can operate the manifold and the at least one supply device based on the override status.

Examples described herein further include systems and methods for controlling operations of a fluid distribution system including multiple manifolds. A first manifold can receive a first mode request or a mode schedule including a next mode of operation for the fluid distribution system ("next mode"). The first manifold may calculate first and second flow requirements for the first and second manifolds, respectively, for the next mode. In some examples the first and second flow requirements can respectively include first and second total flowrates from the first and second manifolds. In other examples the first flow requirements can include at least one of a first inlet flowrate and a first outlet flowrate for the first manifold. In still other examples, the second flow requirements can include a second inlet flowrate and a second outlet flowrate. According to another aspect of the present disclosure, the first manifold may determine required operation states for valves of the first manifold and a second manifold for the next mode based on the first and second flow requirements.

According to an aspect of the present disclosure, a first manifold may be controllably operated to cause a second manifold and a supply device of a fluid distribution system to operate in the required operation states and provide first and second flow requirements. The first manifold can direct the second manifold to independently balance individual outlet flowrates of the second manifold while continuing to provide the second flow requirements. In addition, after implementing a first mode request or a mode from a mode schedule, the first manifold can manage operations of the second manifold to switch between modes based on either a second mode request or a next mode specified in the mode schedule.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Figure 1:
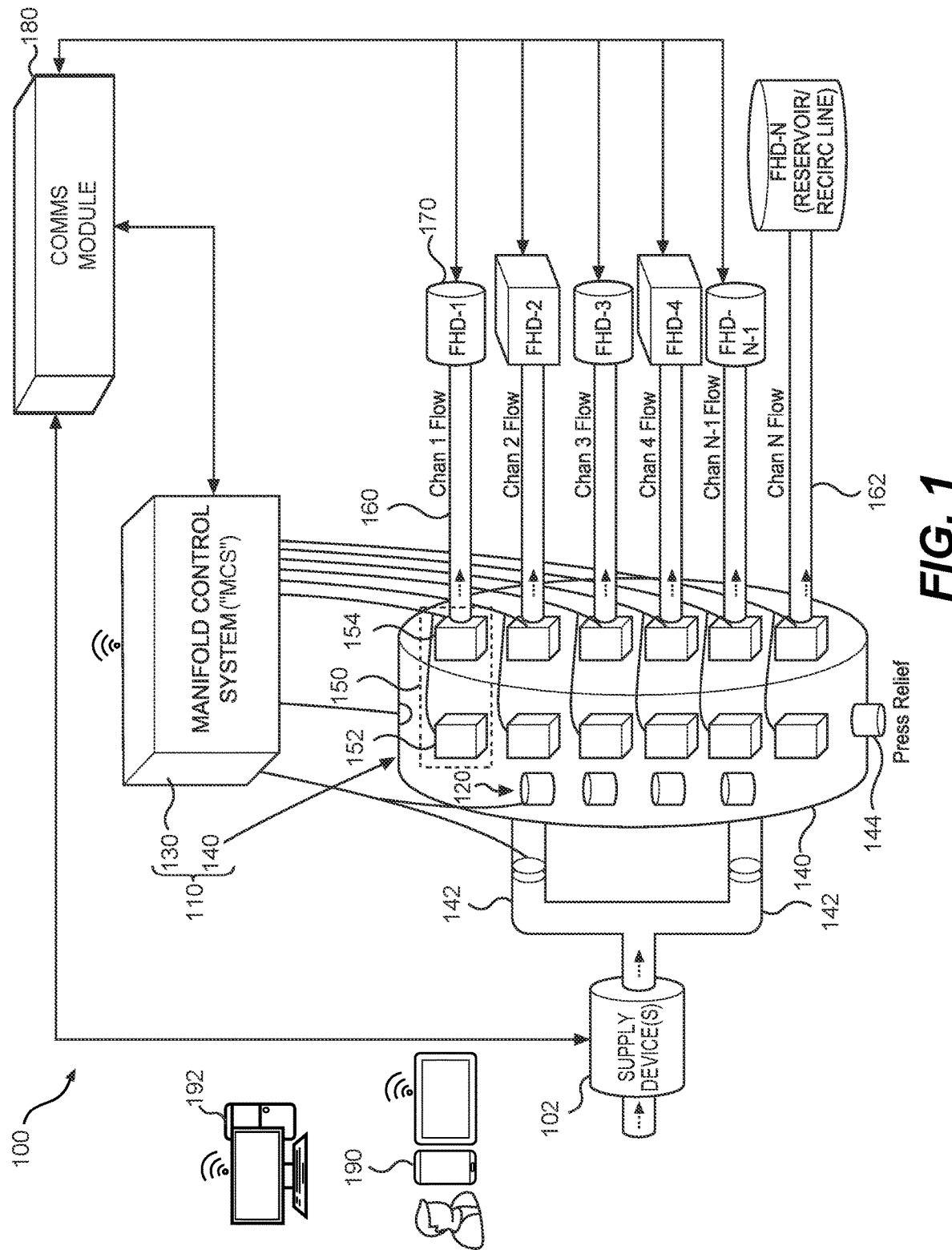
FIG. 1 illustrates is a schematic of an example fluid distribution system including an exemplary manifold, according to an aspect of the present disclosure.

FIG. 1 illustrates a schematic of an example fluid distribution system 100, according to an aspect of the present disclosure. As illustrated, the fluid distribution system 100 includes a supply device 102, a manifold 110 ("manifold 110"), a communication module 120, and several fluid handling devices 170 ("FHD 170" or "FHDs 170"). The manifold 110 includes a manifold control system ("MCS") 130 and a chamber 140. The chamber 140 may include a pair of inlets 142. Provided within the chamber 140 is N number of valve assemblies 150—each valve assembly 150 includes an actuator 152 and a flow sensor 154, and is configured to regulate a respective flow channel 160. In one example, N is equal to six. In addition, a group of fluid property sensors 120 may be installed in the first chamber 140, exposed to fluid flowing therein, and be communicatively connected with the MCS 130. In one example, the fluid property sensors 120 can include air temperature, fluid temperature, chlorine level, oxidation reduction potential ("ORP"), salt concentration, and pressure sensors.

The MCS 130 may include: a computing device, such as a processor, or a group of computing devices; one or more valve controllers that each include a respective computing device; a user interface that includes a display and controls for inputting information and reviewing information stored by the MCS 130; various types of inputs and outputs for power supply and data transfers, for example from actuators 152 and flow sensors 154 directly or through one or more valve controllers; and communication devices that implement one or more communication protocols (e.g., cellular, RS485, wireless—Wifi, Bluetooth, Zigbee, NFC, etc.) so as to be able to communicate with computing devices such as servers, personal computers, laptops, tablets, phones, etc. In another example, any of the exemplary valve controllers described herein and included in an exemplary MCS according to the present disclosure, such as MCS 130, may include a computing device. As used herein, a computing device may include any processor-enabled device, such as a laptop, tablet, personal computer, phone, or hardware-based server.

In one example, the MCS 130 may be in communication with a communication module 180 and/or a user device 190 and/or a fluid system manager device 192. The MCS 130 receives information about the operation of one, more than one, or all of the supply device(s) 102, the valve controllers 150, the FHDs 170, the comm module 180, and the user device 190. In other examples, the MCS 130 may be configured to receive operational data, instructions, or information generally, based on which supply device(s) 102, valve controllers 150, and FHDs 170 the MCS 130 controls, relinquishes control, maintains, and/or modifies the operations thereof. In one example, a particular service executing on the user device 190 or the fluid system manager device 192 may provide an interface that presents options that may be selected to affect the operations of the MCS 130 and therefore the fluid distribution system 100.

In another example, the fluid distribution system 100 may be installed in a pool system, a spa system, or pool and spa system, and the fluid system manager device 192 may be used to check in and check out, or otherwise track people that enter and leave a facility including the pool. A number of people being considered one example of a measurement of fluid distribution system usage (hereafter referred to as "usage" or "usage level"). Other examples of usage may include total operating times for supply device(s), FHDs, and/or manifolds. Still other examples of usage may include a number of filter operations.

The MCS 130 may be informed of a potential total number of people that may actually enter a pool or other measure of usage. In turn, the MCS 130 can use this information to determine how many times fluid within the pool needs to be turned over during certain periods of a day to meet basic sanitation requirements, while not over running a pump, for example, provided as a supply device. This is due to the fact that MCS 130, through the flow sensors 154, can obtain the precise volume of fluid that is cycling, or has cycled, through the pool for any given period of time. Furthermore, based on the MCS 130 having control of its respective valves and in some cases, the supply device(s) 102, and knowing flowrates of fluid exiting its respective valves (and in some cases the supply device(s) 102 as well), the MCS 130 can project how much fluid will cycle through the pool over a given future period of time. As a result, the MCS 130 can use the usage level to turnover an exact volume of fluid that must cycle through the pool over a period of time to meet sanitation requirements, and doing so without running or otherwise operating the supply device(s) 102, which may include a pump, more than needed.

Each flow channel 160 can be in fluid communication with a fluid handling device 170 ("FHD 170"), such as a pump (e.g., a jet pump), a filter, a valve, a type of plumbing component, a cleaning system, a heater, or a water feature (e.g., fountain, spray, bubbler, etc.). The chamber 140 of the manifold 110 may be provided with a pressure relief valve 144.

At least one of the flow channels 162 may be in fluid communication with a fluid reservoir or a recirculation channel upstream of the inlets 142 or the supply device 102. This flow channel 162 may be regulated as part of a process of balancing all channels to obtain required flowrates in each of those channels. A valve of the manifold 110 regulating the flow channel 162 may therefore be considered a "bleed valve."

Figure 2:
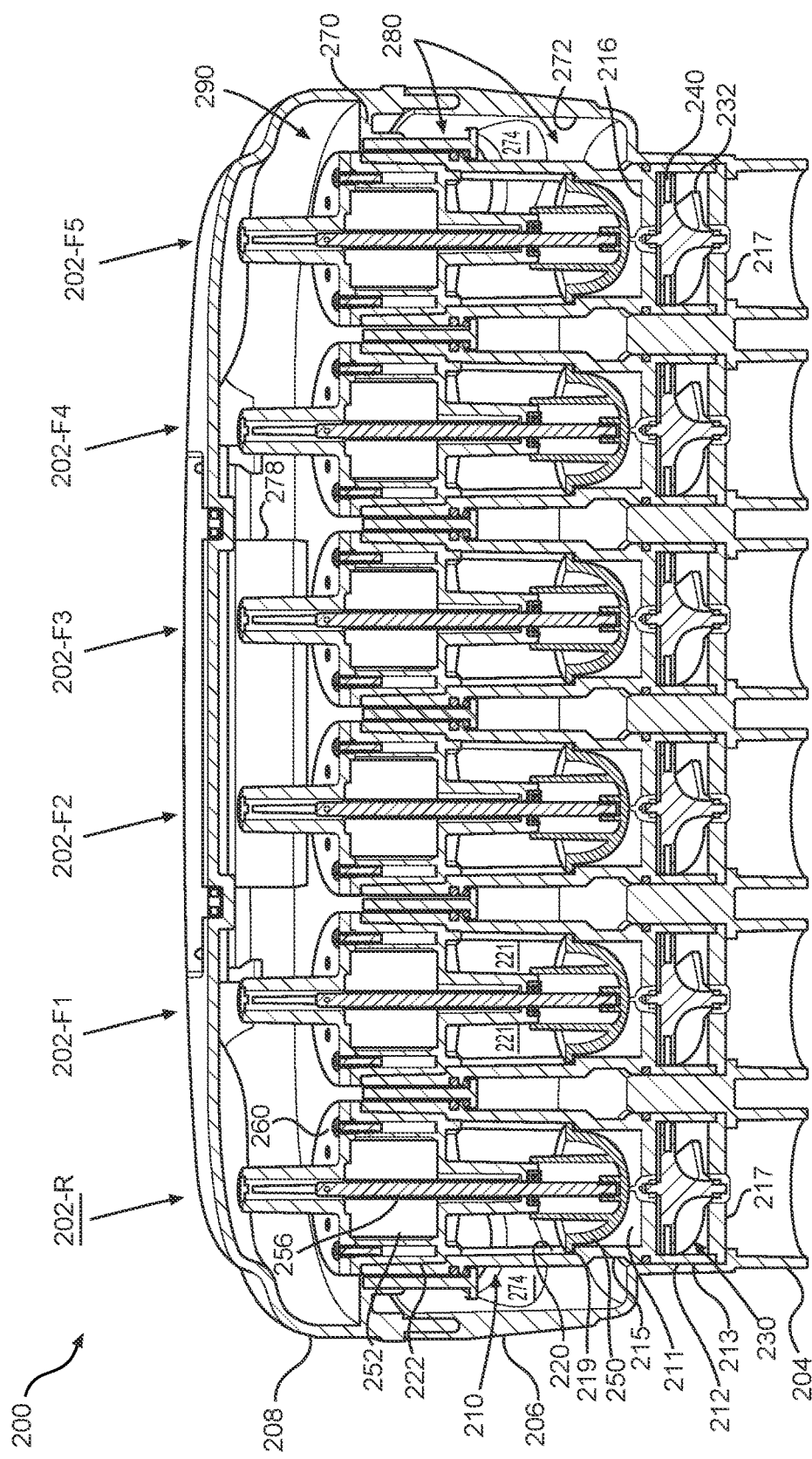
FIG. 2 is a sectional view of a manifold, according to an aspect of the present disclosure.

FIG. 2 is a sectional view of a manifold 200 ("manifold 200"), according to an aspect of the present disclosure. A surrounding wall 272 of a first housing 206 of the manifold 200 defines inlet ports 274 and a pressure relief port (not shown) within the first housing 206. The inlet ports 274 and the pressure relief port respectively extend from the surrounding wall 272.

The manifold 200 and valve assemblies 202 illustrated in FIG. 2, and any other manifold and valve assembly described herein, may operate and include all the features and components of any manifold and any valve assembly described in U.S. patent application Ser. No. 17/185,897 entitled "MANIFOLD" and U.S. patent application Ser. No. 17/185,926 entitled "VALVE ASSEMBLY," both of which were filed Feb. 25, 2021, and both of which are incorporated by reference in their entireties for all purposes.

The inlet ports 274 are provided on opposite ends of the first housing 206 so that a flowrate of fluid flowing in a first chamber 280 and around valve assemblies 202 is substantially uniform. Although inlets and corresponding inlet ports 274 could be provided in multiple numbers and locations, the configuration illustrated provides advantages over configurations that include one inlet on just one end, or in a middle portion of the first housing 206. In these configurations, an incoming flowrate may be lower for fluid flowing to valve assemblies 202 located within the manifold 200 further from the inlet than flowrates for assemblies located closer to the inlets. The duel inlet ports 274 of the exemplary manifold 200 convey fluid into the first chamber 280 from opposite ends of the first housing 206 to reduce the opportunity for non-uniform flowrates.

In one example, each valve assembly 202 can include a valve housing 210 having a first mating structure 212 extending from two or more wall segments 220 that extend from a second mating structure 222. In the example illustrated in FIG. 2, the valve housing 210 has an overall cylindrical shape, but one of ordinary skill in the art will recognize that other configurations may be used. The first mating structure 212 includes a first end 213 that is sized so as to fit within a proximal end of an outlet 204 provided by the first housing 206. The first end 213 of the first mating structure 212 may define an end face that may engage an end piece 217 of the valve assembly 202 that secures an impeller 230 within the first end 213.

The impeller 230 is positioned within the end of the first mating structure 212 and carries one or more magnets 240 within individual blades 232 of the impeller 230. Each blade 232 includes a base portion, and at least two or more base portions may be formed with bores configured to receive magnets 240. In one example, the magnets 240 are positioned within base portions of the individual blades 232 that are diametrically opposed to each other relative to a longitudinal axis of the impeller 230.

The magnets 240 provide a second flow monitoring component configured to be paired with a corresponding first monitoring component provided in a sensor assembly (not shown) mounted to the outside of first housing 206 in the area of the outlet ports 204. In one example, the first flow monitoring component includes a Hall effect device for each impeller 230 that is fixed to a strip or elongated terminal (not shown) configured to operate as a bus. The bus (not shown)

is configured to transmit signals, generated by the first flow monitoring components, to an MCS 278 positioned in a second chamber 290 defined by a second housing 208 or any type of MCS described herein. As fluid flows through the end of the valve assembly 202 including the first mating structure 212, the impeller 230 is caused to rotate at a speed that may be proportional to a flowrate of the fluid flow through the first mating structure 212 and out of the outlet 204. Rotation of the impeller 230 may be detected by the first flow monitoring component as it registers the rotational movement of the magnets 240, and used to determine a flowrate of fluid passing through a respective outlet 204.

A second end 215 of the first mating structure 212 is separated from the first end 213 by a partition 216 as shown in FIG. 2. Above the partition 216, the second end 215 of the first mating structure 212 defines a fluid chamber 211 with a bore or other shaped area that may receive a valve member 250 of the valve assembly 202. The second end 215 of each first mating structure 212 defines an end face 219 configured to provide a valve seat (hereafter referred to as "end face 219" or "valve seat 219") for engaging a valve member 250 of each valve assembly 202. During a valve closing operation, an actuator 252 of a respective valve assembly 202 may be operated to bring a surface of the valve member 250 into abutment with the end face 219 and provide a tight seal. As a result of this operation, fluid flowing within the first chamber 280 will not enter the first mating structure 212, and therefore not flow through the partition 216, past the impeller 230, and out of the distal end of the outlet 204.

Turning to the second mating structure 222 of the valve housing 210, this portion of the valve assembly 202 is configured to slide in and be locked in a slot of a valve retainer 270. An actuator sub-assembly of each valve assembly 202 includes the actuator 252 positioned in a housing defined by an inner surface of the second mating structure 222. The actuator 252 is operatively coupled to a prime mover 256 configured to engage the valve member 250. In one example, the actuator 252 may include a stepper motor having a stator and rotor, and the prime mover 256 may include a threaded main shaft that is caused to move in a linear manner by rotation of the rotor of the stepper motor.

Upward movement of the prime mover 256 will likewise cause an upward movement of the valve member 250 away from the valve seat 219 defined by the second end 215 of the first mating structure 212. However, as with the valve assembly 202 illustrated in FIG. 2, the valve member 250 may be shaped so that moving away from the valve seat 219 gradually lessens by how much a fluid port defined by the first mating structure 212 is obstructed by a body of the valve member 250. A flowrate of fluid entering the second end the first mating structure 212, and thus exiting through the outlet 204, increases or decreases in proportion to a degree to which the valve member 250 obstructs an opening to the fluid chamber 211 defined by the second end 215 of the first mating structure 212. In the exemplary case shown, with the actuator 252 provided by a stepper motor, the actuator 252 can controllably move the prime mover 256, and thus the valve member 250, in extremely small and precise increments. As a result, a degree to which the opening to the fluid chamber 211 is obstructed by the valve member 250, and flowrate of fluid through the outlet 204, may be controlled to a very precise degree by the MCS 278, which may include all the capabilities of any exemplary MCS described herein, such as the MCS 1300 shown in FIG. 13.

The MCS 278 dynamically controls the flowrate of fluid through the outlets 204 by operating the valve assemblies 202. Further, the MCS 278 is positioned, at least in part, within the second chamber 290 defined by the valve retainer 270 and the second housing 208.

With a common source of fluid, for example the supply device 102 of the fluid system 100 of FIG. 1, connected to the inlet ports 274 of the manifold 200, fluid will enter and fill the first chamber 280. Any one, or more than one, of the valve assemblies 202 illustrated in FIG. 2 may regulate fluid flow to a flow channel in fluid communication with an FHD, a reservoir, or a recirculation line.

As shown, each of the valve assemblies in FIG. 2 includes a valve housing 210 that includes wall segments 220 which define open chambers 221 surrounding a respective valve member 250 upstream of a respective valve seat 219. During operation, a valve member 250 for any of the valve assemblies 202 may be moved within an open chamber 221 defined by respective wall segments 220 toward or away from a respective valve seat 219. Movement away from the valve seat 219 will allow or increase fluid communication between the open chamber 221 and a fluid chamber 211 downstream of the valve seat 219. Each of the valve assemblies 202 may be configured such that the first chamber 280 surrounding the wall segments 220, and thus the open chambers 221, provides a supply of fluid of which each valve assembly 202 regulates a flow of through a respective outlet 204.

For the purposes of explaining a total flow balancing operation of the manifold 200, the first valve assembly on the left side of FIG. 2 has been designated with reference numeral 202-R to indicate it regulates a flow of fluid to a reservoir or a recirculation line, and will be referred to as "bleed valve assembly 202-R." In addition, the remaining valve assemblies are labeled with an "-F" and a number corresponding to a number of an FHD it regulates flow to.

Together with the bleed valve assembly 202-R, the channel connected to a reservoir or recirculation line may be utilized as a bleed passage to compensate for changes to required flowrates, or an input flowrate from a common fluid source. In the latter case, there could be an instance where an object or debris is stuck in a channel between a supply device and a tee (or even a branch thereof) or other fitting connected to the inlet ports 274. In such a situation, where the bleed passage previously in an open or semi-open state, the reduced input flowrate would be detected through one or all the valve assemblies 202-F1 to F5, and the bleed valve assembly 202-R may be closed to increase fluid flowrate to all the other valve assemblies.

The manifold 200 of the present disclosure is configured to deliver precise specified flowrates from each of the outlets 204 illustrated in FIG. 2, as described above. From a practical standpoint, the methods and systems described herein enable independent control of each of the valve assemblies 202-R, 202-F1 to F5 such that a first valve assembly 202-F1 may be adjusted in isolation, or in combination with a second valve assembly 202-F2, to obtain a desired flowrate through the first valve assembly 202-F1. In the second situation, the MCS 278 can operate the valve assemblies 202-R and 202-F1 to F5 independently of one another, meaning their respective operations do not have to be simultaneous (although they may be achieved substantially simultaneously with the manifold 200 of the present disclosure).

Furthermore, especially in the case where three or more valve assemblies are provided, operation of the second valve assembly 202-F2 to compensate for a required flowrate increase or decrease for first valve assembly 202-F1, does not mandate that a required flowrate, or a change in a required flowrate, for the second valve assembly 202-F2 be ignored or addressed at a later time. Rather, the bleed valve assembly 202-R may be used to compensate for a change in required flow from any one or more of the valve assemblies 202-F1 to F5. In addition, where tolerances are used as discussed below, a third valve assembly 202-F3 could be operated to allow for adjustments to the flowrates through both of the first and second valve assemblies 202-F1, 202-F2.

In one example, an MCS 278 can operate the valve assemblies 202 to obtain required flowrates within a standard range of deviation, ±1% of required flowrate for example. Accordingly, the MCS 278 may operate several of valve assemblies, or several combinations of several valve assemblies, so that a flowrate through one particular valve assembly comes within that tolerance, while flowrates through other operated valve assemblies stay within the tolerance. Thus, the MCS 278 may adjust one or more other valve assemblies 202 to deviate more from a current required flowrate than at the present moment, but still within the predefined standard deviation, to obtain this result.

Figure 3:
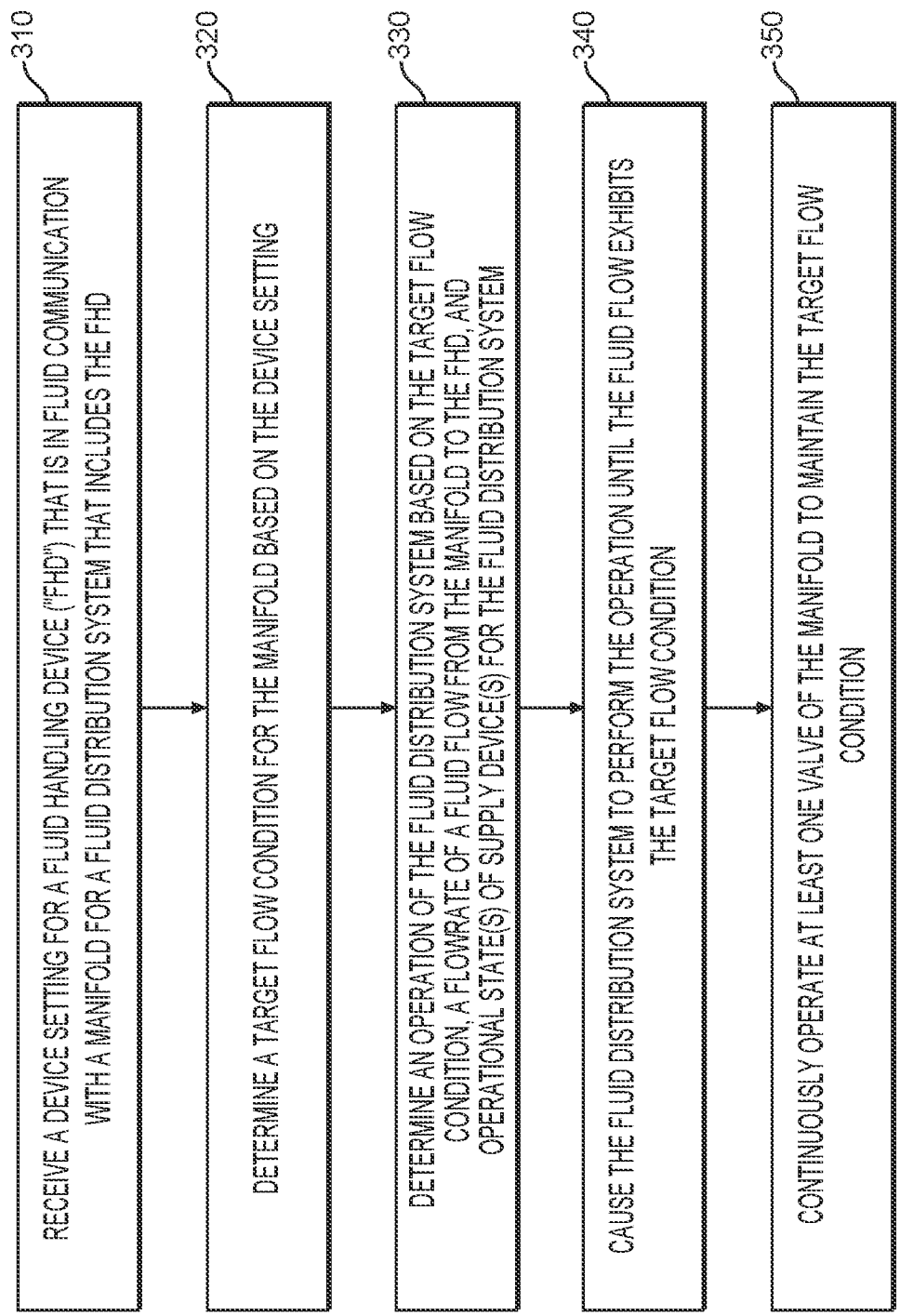
FIG. 3 is a flowchart for an example method for controlling operations of a fluid distribution system including a manifold.

FIG. 3 is a flowchart for an example method for controlling operations of a fluid distribution system including a manifold, according to the present disclosure. At stage 310 an MCS for a manifold can receive a device setting for an FHD that is in fluid communication with the manifold. The manifold may be part of a fluid distribution system that includes multiple FHDs including the device for which the device setting was received in stage 310. In one example, the FHD can include a pump (e.g., a jet pump), a filter, a valve, a type of plumbing component, a cleaning system, a heater, a water feature (e.g., fountain, spray, bubbler, etc.), or even a fluid container such as a pool or a spa.

The device setting received in stage 310 can include: an operational setting for the FHD (e.g., high, medium, low), a usage level, an operating time, and an operating sequence (e.g., 5 minutes on, 5 minutes off, 10 minutes on, 10 minutes off, etc.). In other examples, the device setting can include an input flowrate for fluid to be delivered to the FHD. The device setting could include a rate of increase or decrease in input flowrate (i.e., a ramp up or ramp down rate) of fluid delivered to the FHD. In another example, the device setting can include a total volume of fluid to be received by the FHD, and an amount of time over which the total volume of fluid needs to be received.

In yet another example, the device setting can include an average chlorination level that must be maintained for a period of time, or which a total volume of fluid cycled through the manifold and delivered to the FHD must be minimally at over a predetermined period of time. In still another example, the device setting can include an average fluid temperature that must be maintained for a period of time, or which a total volume of fluid cycled through the manifold must be minimally at over a predetermined period of time.

In yet another example, the FHD may include a second manifold, and the device setting received in stage 310 may correspond to a maximum inlet flowrate to or maximum total output flowrate from the second manifold. In the latter example, the device setting received may include an input flowrate for the second manifold that allows for an optimum range of modulation with respect to valves of, as well as a maximum total flowrate from, the second manifold.

In stage 320, a target flow condition may be determined for the manifold based on the device setting received in stage 310. In one example, where the device setting includes an input flowrate to the FHD, the MCS may determine that the target flow condition includes an output flowrate for a fluid flow from the manifold to the FHD that is equal to the input flowrate specified in stage 310. In other examples, the fluid distribution system may include flow sensors at the inlets of FHDs such as the FHD of stage 310. The MCS may be in communication with the sensors directly or through a communication module, and be able to track, estimate, or otherwise recognize a head loss between the manifold and the FHD. As a result, the MCS can determine the target flow condition for the manifold that will deliver a required input flowrate, even when there is not a one to one (or even a consistent proportional) relationship between the FHD's input flowrate and a flowrate for the fluid flow from the manifold to the FHD.

In one example, the MCS may receive a total volume of fluid that must be delivered to the FHD over a predetermined period of time as the device setting. In addition, the device setting received may include set start and end times for the period. The MCS is configured to communicate with flow monitoring components, as described herein, and obtain, in real-time, output flowrates through each valve and out each's respective outlet of the manifold. In addition, the MCS can access historical output flowrates recorded for each of the valves.

With access to both real-time and historical information from the flow monitoring components for a particular valve or group of valves, the MCS can determine discrete volumes of fluid flowing through that particular valve or group valves over a past period of time. In addition, the MCS can determine these discrete volumes as they increase due to continuing fluid flow through that particular valve or group of valves. Furthermore, the MCS can use these discrete volumes as a basis for converting a required total volume provided as the device setting in stage 310, into a flowrate for delivering said total volume over a specified period of time. Add to this an ability of the MCS to track a cumulative volume that has flowed through any valve relative to a particular start time, and the MCS can recalculate and either increase or decrease a flowrate through a given valve to ensure that a requested total volume of fluid is delivered through that valve in a time remaining before a specified end time. Accordingly, the MCS can account for fluctuations in flowrates that may occur during predetermined periods of time due to various factors (e.g., filter blockages, unexpected pump downtime, rain, fluid handling device malfunctioning, etc.), and still deliver, or have cycled through a particular valve by a specified end time, a precise volume of fluid specified in stage 310.

In another example, the device setting received in stage 310 can include a sequence of volume increments for delivering a total volume. As a result, the MCS may determine a schedule of flowrates to implement in order to deliver the required schedule of volume increments. In such an example, the MCS may implement a standard deviation with respect to output flowrates in order to minimize a number of valve or pump operations required to deliver a specific flowrate or volume of fluid.

In still other examples, the MCS may determine multiple target flow conditions based on a scope of control the MCS has with regards to (A) the valves of the manifold that serve the FHD from stage 310, and (B) a supply device or devices of the fluid distribution system, such as a pump or flow regulating control valve upstream of the manifold. More specifically, the MCS may determine a target flow condition for just a valve servicing the FHD where the MCS has full control over a supply device including a pump. In other examples, the MCS may determine target flow conditions for multiple valves of the manifold for situations in which the only means for changing flowrates through the individual valves requires operation of the valve serving the FHD and at least one other valve (e.g., a valve in communication with a fluid reservoir or recirc line).

At stage 330, the MCS may determine an operation of the fluid distribution system based on the target flow condition(s), a current flowrate of the fluid flow from the manifold to the FHD, and an operational state for a supply device (or operational states of supply devices) of the fluid distribution system.

In one example, the current flowrate may include the flowrate from the manifold to a channel that is in fluid communication with, or otherwise serves, the FHD for which the device setting was received in stage 310. In another example, the current flowrate may include the sum of flowrates for more than one channel that serves the FHD. In yet another example, the current flowrate may include the sum of the output flowrate from the manifold to the channel that serves the FHD, and the output flowrate from the manifold to a channel that serves as a return line to a fluid reservoir or recirculation line (also referred to herein as a "bleed channel" or "bleed valve").

The MCS may be in communication with one or more supply devices that circulate or otherwise convey fluid through a fluid distribution system including the FHD and the manifold. The MCS can monitor any operational aspect of the supply device including, for example where a supply device or devices include a pump, input and output flowrates (e.g., gallons per minute (gpm)), pump speed (e.g., revolutions per minute for pump motor (rpm)), power consumption, inlet and outlet pressure (psi), total head (feet (ft)), inlet and outlet velocity (ft/s), and pump and pump motor efficiency settings. In addition, the MCS can communicate with the one or more supply devices and obtain, or be pre-programmed with ratings (e.g., minimums and maximums) for the supply device(s) for any operating parameter. As a result, the MCS is configured to recognize any remaining operational capacity of the supply device during system operation or know when the supply device is being overloaded.

Stage 330 may also include the MCS determining that a change in supply device operation is or is not required to obtain the target flow condition. For example, the MCS may recognize a position of a valve member for a first valve serving the FHD from stage 310 is substantially closed. As a result, the MCS may determine based on an input flowrate of fluid into the manifold, that only an opening operation of the first valve is required for the target flow condition to be reached. In another example, the valve member may be in a full or substantially open position, and at the same time a second valve of the manifold in fluid communication with a reservoir or recirculation line may be in a partial or substantially open position. In this situation, the MCS may determine that closing the second valve and moving the first valve to a full open position will cause a flowrate through the first valve that provides the target flow condition.

In either of the scenarios described above, as well as any other scenario described herein, the MCS may determine that operation of manifold valves alone, may not be sufficient to obtain the target flow condition. For example, the MCS can determine a maximum total output flowrate through the manifold and use this value to determine if the manifold has capacity, with valves alone, to generate the target flow condition. For example, in the situation with the first and second valves mentioned above, calculate a first estimated total flowrate from the manifold with the second valve in, for example, a fully closed state, and the first valve in, for example, a fully open position. In addition, the MCS can determine a second estimated total flowrate from the manifold with the first valve, irrespective of valve member position, meeting the target flow condition and the second valve in the fully closed position.

The MCS can compare the estimates and determine based on the second estimate being greater than the first estimate, that a supply device operation is required to obtain the target flow condition. In another example, the MCS may determine that the second estimate is less than the first estimate but flowrates through valves of the manifold that are not the first and second valves, cannot be maintained at required levels because the flowrate through the first valve would account for too great of a proportion of the total flowrate from the manifold (i.e., the sum of all flowrates of fluid flowing through the valve regulated outlets of the manifold).

In stage 340 the MCS for the manifold can cause the fluid distribution system to perform an operation determined in stage 330 until the manifold, inclusive of the fluid flow from the valve or valves serving the FHD, exhibits the target flow condition. Accordingly, in stage 340, the MCS may operate an actuator for a particular valve or actuators for a group of valves that serve the FHD from stage 310 such that the FHD-serving valve or valves are opened or closed to a greater degree. In addition, stage 340 could include the MCS operating another valve of the manifold to increase a flowrate of fluid within a common chamber shared by all the manifold valves, and cause actuators of other valves to close to compensate for the increased flow through the manifold specifically created for the particular valve or group of valves. In one example, a processor for the MCS may execute or otherwise have implemented thereon a valve operation service that communicates with and directs the operations of valve controllers for each of the valves provided by the manifold.

Any and all of the operations described above may be coupled with an operation by the MCS of the supply device to increase or decrease a flowrate of fluid delivered to the manifold. In one example, a processor for the MCS may execute or otherwise have implemented thereon a supply device operation service that communicates with and is configured to direct some or all operations of the supply device.

At stage 350, the MCS can continuously operate at least one valve of the manifold to maintain the fluid flow through a particular valve or group of valves serving the FHD of stage 310 at the target flow condition. In one example, the MCS can control the actuator for the particular valve or actuators for the particular group of valves that serve the FHD to maintain flowrates therethrough within a standard deviation (e.g., ±2%, ±3%, ±4%, ±5%, etc.) of a flowrate corresponding to the target flow condition. In another example, the MCS can operate the second valve as previously described, to compensate for any fluctuations in the valve or valves serving, and/or those valves that do not serve, the FHD. In other examples, the MCS can operate valves of the manifold according to any of the operational schemes described in U.S. patent application Ser. Nos. 17/185,897 and 17/185,926. Still further, the MCS can employ control over the operation of one or more supply devices of the fluid distribution system to maintain the target flow condition.

Figure 4:
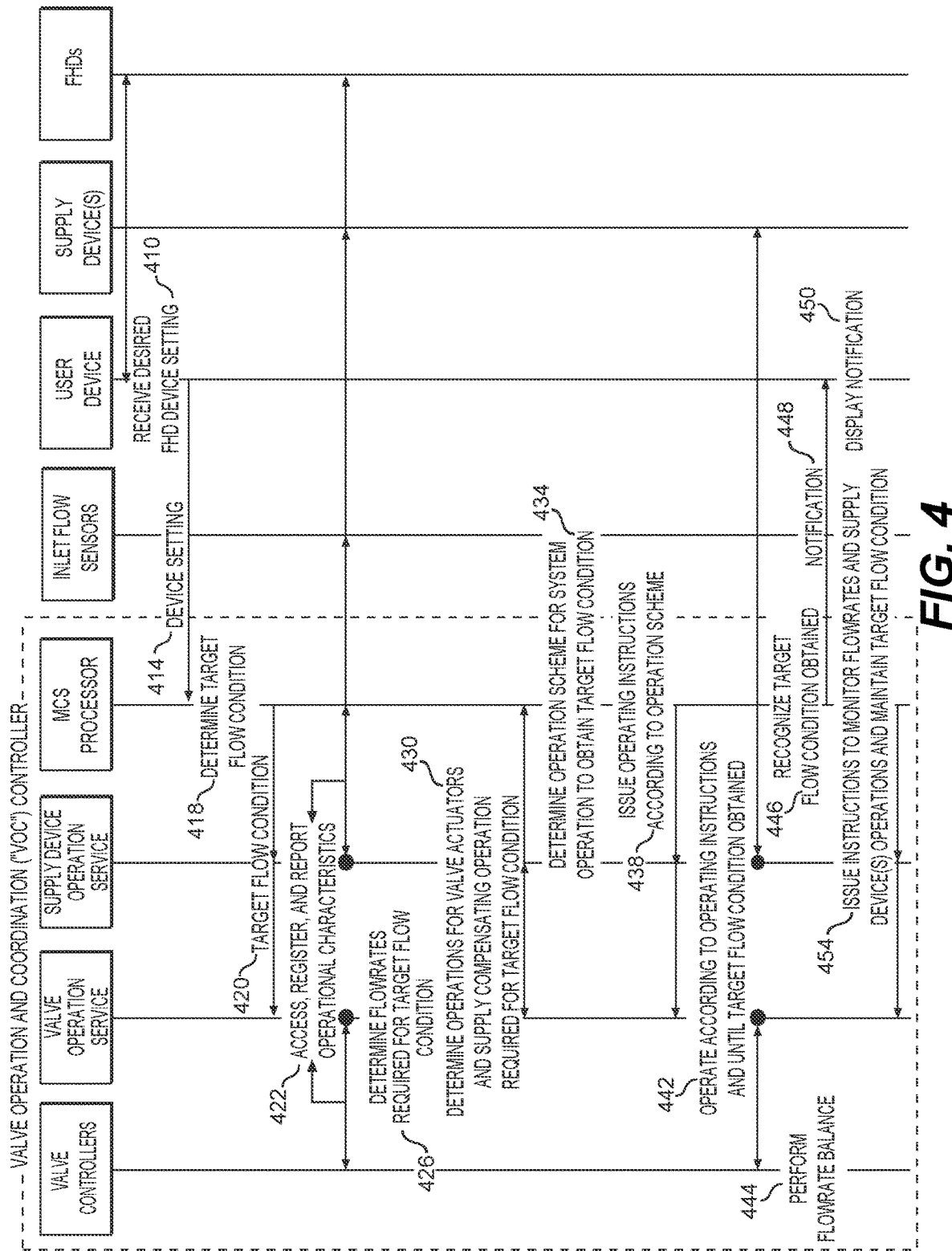
FIG. 4 is a sequence diagram of an example method for controlling operations of a fluid distribution system including a manifold configured to control a supply device(s).

FIG. 4 is a sequence diagram of an example method for controlling operations of a fluid distribution system including a manifold configured to control a supply device.

At stage 410 a desired FHD device setting may be received from a user device operated by an administrator or other individual that tracks operations of a fluid distribution system, such as the exemplary fluid distribution systems described herein. In one example, a service may be implemented on the user device that is configured to display operational states of different components of a fluid distribution system, such as any of the exemplary FHDs described herein. In addition, the user device may be configured to communicate with a valve operation and coordination controller ("VOC") for an MCS, as well as one or more FHDs. Accordingly, the device setting received in stage 410 may be transmitted to an MCS processor for the VOC in stage 414. In another example, a desired setting for an FHD may be received by a control for the FHD and then transmitted to the VOC via the MCS processor.

At stage 418, the MCS processor can determine a target flow condition corresponding to the device setting received in stage 410. In one example, stage 418 can include all of the operations, processes, determinations, and outputs performed or output as part of stage 320 as previously described. In stage 420, the target flow condition may be provided to valve and supply device operation services being implemented by the VOC. In one example, each of the valve and supply device operation services may be constituted by an application or agent running, or otherwise being implemented on the VOC, that may be part of, or configured to be compatible with, a software product that is installed on or at least partially provided by the MCS processor. The software product can provide tools for fluid distribution system management, communication and coordination, flowrate estimating and modeling, data conversion and formatting, generating components and/or selectable options of a user interface ("UI"), such as a graphical user interface, supporting selections made through a UI, and any other relevant features.

At stage 422 the valve and supply device operation services can access, register, and report operational characteristics for any valve of the manifold operated by the VOC, and any supply device that is part of the fluid distribution system that includes the FHD specified in stage 410. In one example, the valve operation service can prioritize an operational state and characteristics of a particular valve or group of valves that serve or are otherwise in fluid communication with the FHD or FHDs that the received device setting applies to. In another example, the supply device operation service may poll the supply device(s), flow sensors downstream of the supply device and upstream of the manifold, and the FHDs to determine current operating characteristics of all such devices. Thus, information obtained in stage 422 can serve as a baseline from which to determine all operations by the fluid distribution system that may be implemented to obtain the target flow condition determined in stage 418.

In stage 426 the valve operation service can determine flowrates required for a valve or valves serving the FHD, and any other valves of the manifold. In one example, the valve operation service can estimate total flowrate capacities and requirements to provide the target flow condition. As described previously, and below with reference to FIG. 5, determination of flowrate requirements can include deriving a flowrate from a total volume, average temperature, average chlorination, or schedule of discrete volume outputs for the valve or valves that service the FHD specified in stage 410. In one example, the valve operation service can determine a combination of flowrates for the FHD serving valve(s) and a bleed valve for the manifold so that flowrates for other valves of the manifold do not require, or only require minimal, adjustments.

At stage 430 the valve and supply device operation services can determine operations required for valve actuators and the supply device(s) required to produce the target flow condition. In one example, stage 430 can include at least all the operations, processes, determinations, and outputs performed or generated as part of stage 330 as previously described.

In another example, stage 430 can include determining several operation schemes that could produce the target flow condition. In one example, the MCS processor can instruct the valve and supply device operation services to provide multiple operation schemes for just the valves of the manifold, just the supply device(s), and a combination of the valves and the supply device(s) that could result in the target flow condition being obtained. Further, the MCS processor may specify a priority for valve only, supply device only, or a combination of valve and supply device operations for the operation services to consider in determining the operation schemes.

In this stage, the valve operation service may determine that a valve only operation is not possible. In another example, the MCS processor may provide the valve and supply device operation services with a predetermined schedule of operations for one or more FHDs to occur in the immediate future. The valve operation service may determine that given the future schedule of operations, a valve only operation may be possible initially, but have to be supplemented with a supply device operation after a short period of time. The supply device operation service may provide a power consumption required for a supply device only, as well as a valve assisted operation scheme.

In stage 434 the MCS processor can determine which operation scheme to implement with the fluid distribution system to obtain the target flow condition. In one example, the MCS processor may select the operation scheme that involves the fewest operations between the valves for the manifold and a control and/or components for the supply control device(s). In another example, the MCS processor can compare projected energy consumption for each scheme and select the operation scheme with the lowest energy consumption. In yet another example, the MCS processor, taking into account a predetermined schedule of operations, can select the operation scheme that will require the fewest valve and supply device operations or the lowest energy consumption required in transitioning to a next scheduled operation.

At stage 438 the MCS processor can issue operating instructions to the valve and supply control device operation services according to an operation scheme selected in stage 434. In stage 442 the operation services can operate respective manifold and system components according to the instructions provided by the MCS processor in stage 438. As the operation services control or otherwise operate the valve controllers for the manifold, and direct operations of the supply control device(s), each service can monitor performance characteristics of respective operations. For example, the valve operation service can continuously poll the valve controllers to obtain the flowrates (via flow sensing components in communication with respective valve controllers) from some or all the manifold valves. As a result, the valve operation service can determine, with a high degree of precision, the point at which the target flow condition is obtained for the valve or valves that control fluid flow to the FHD specified in stage 410.

In one example, the valve controllers can perform a flowrate balance operation in stage 444 in response, or as a secondary control sequence to the operations of the valve controllers by the valve operation service in stage 442.

In the former case, the valve controllers can perform a flowrate balance operation as described in U.S. patent application Ser. Nos. 17/185,897 and 17/185,926 to operate actuators such that a flowrate from a valve, or flowrates for valves serving the FHD, are incrementally changed until a required flowrate or flowrates are detected by respective flow monitoring components. The detected flowrate(s) are continuously transmitted to the valve operation service.

In the latter case, the valve operation service can determine the precise valve operation or valve operations that are required (e.g., valve member position) for a required flowrate for the valve or valves for the FHD to generate the target flow condition. The particular operation(s) may be determined based on an input flowrate for the manifold, a scheduled operation of the supply control device, and/or a remaining flowrate modifying capacity of a bleed valve. In this example, the flowrate balancing operation in stage 444 can consist of the valve controllers continuously operating the valve actuators for the manifold to maintain or slightly modify respective valve openings so that respective flowrates therethrough remain within a predetermined standard deviation—thereby maintaining a target flow condition obtained in stage 442.

In stage 446, the MCS processor can recognize a target flow condition has been obtained and issue a notification to the user device in stage 448. At stage 450, the user device can display the notification that the target flow condition has been obtained by the fluid distribution system, and more specifically by the manifold.

At stage 454, the MCS processor can issue instructions to monitor flowrates and supply control device(s) operations to maintain the target flow condition. In one example, the MCS processor can include a flowrate check frequency. In other examples, the MCS processor can specify a standard deviation for the flowrates for the valve or valves for the FHD(s) from stage 410.

Figure 5:
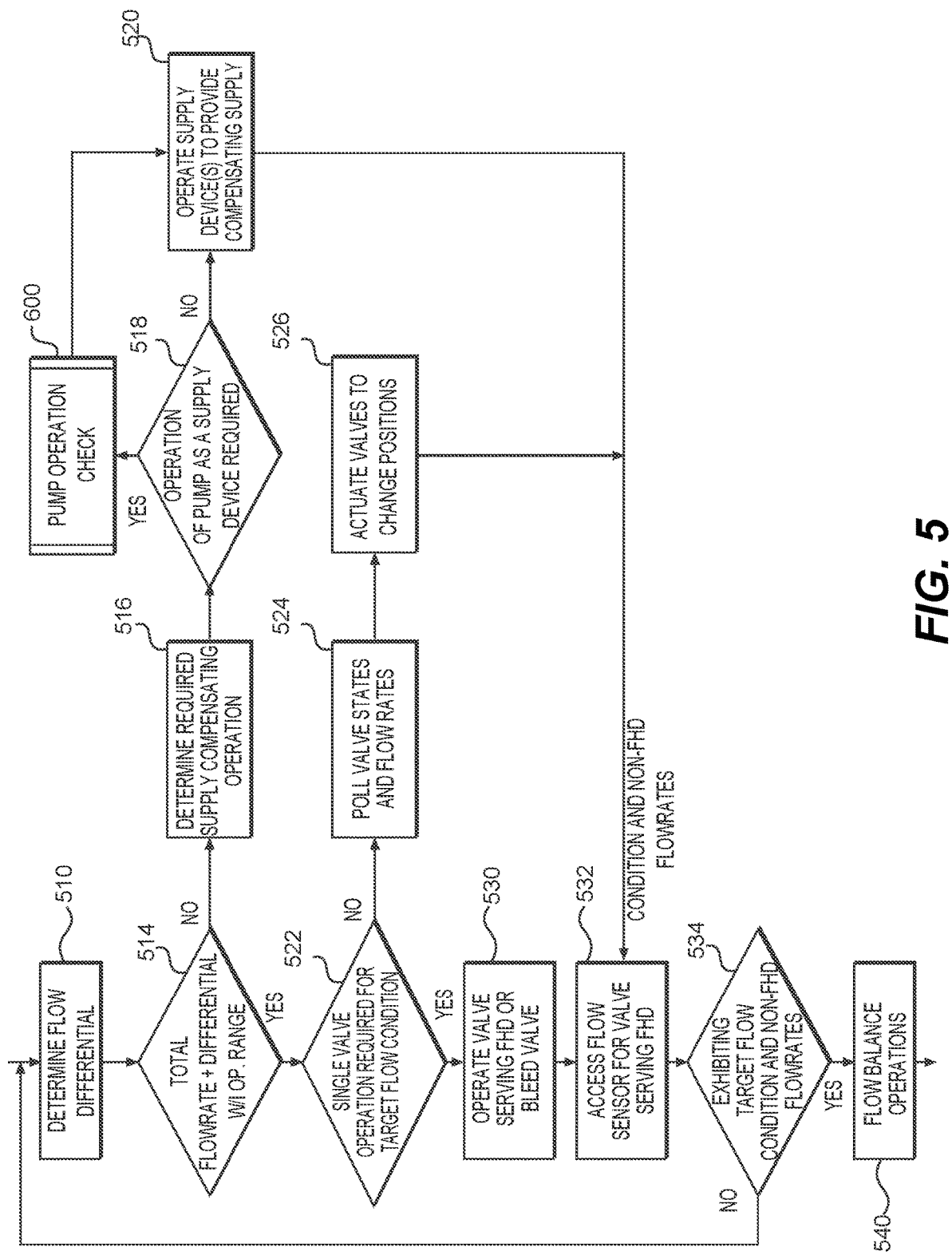
FIG. 5 illustrates an algorithmic flow chart of an example method for determining and implementing an operating sequence for manifold valves and supply device(s).

FIG. 5 illustrates an algorithmic flow chart of an example method for determining and implementing an operating sequence for manifold valves and a supply device or devices for a fluid distribution system. In stage 510, an MCS can access flowrates for the valve or valves serving an FHD for which a new device setting has been received. From the current flowrate(s) for the FHD-serving valve or valves, the MCS can determine flow differential(s) between a flowrate or group of flowrates corresponding a determined target flow condition, and the current flowrate or group of flowrates.

At stage 514, the MCS can evaluate whether a total flow capacity of the manifold can accommodate, without any degree of fluid supply compensation, the differential determined in stage 510. More specifically, the MCS can determine an estimated total flowrate by adding the differential to a current total flowrate for the manifold and compare that to a maximum flow capacity of the manifold. In one example, a total flowrate for the manifold is equal to a sum of flowrates of all fluid flows output through the valves of the manifold. The maximum flow capacity may be an estimate for the total flowrate from the manifold with a bleed valve fully open or fully closed in some examples. If the estimated total flowrate is greater than the maximum flow capacity, than the differential (and the target flow condition) is not within a range of flowrates producible by an operating range of the manifold alone. As a result, the MCS can determine a required compensating fluid supply operation in stage 516.

It will be noted that a maximum flow capacity for the manifold is a total flowrate that accounts for any head loss or other flowrate influencing factors inherent to conveying fluid through the manifold. As a result, the maximum flow capacity is a more accurate indicator of a total flow that may be provided from the manifold than an estimate solely based on an inlet flowrate of the fluid being supplied to the manifold.

Turning to stage 516, one of the MCS processor or a supply device operation service can determine how and by how much a fluid supply to the manifold inlets must be supplemented to compensate for a difference between a current maximum total flow capacity and the estimated total flow determined in stage 514.

As discussed above, supply devices may include pumps, control valves, and other devices that can actively modify a flowrate of fluid being supplied to a manifold. As a result, stage 516 may include determining an operating range of a control valve to change a degree by which the control valve closes or occludes a fluid supply line upstream of the manifold. In another example, the supply devices may include a control valve upstream of a pump which is upstream of the manifold. The MCS can determine whether or not increasing a supply to the pump by opening the control valve may provide sufficiently compensating supply of fluid flow to the manifold. In yet another example, the supply device may include a pump upstream of a control valve that is upstream of the manifold. The MCS, having inlet and outlet flowrate information directly from these devices, or from sensors installed in the fluid distribution system, can determine the combination of operations that may be required to increase or decrease a manifold inlet flowrate that may increase or decrease the maximum total flow capacity for the manifold as needed so that the current total flow plus the differential from stage 510 is within the manifold's range of valve operations.

At stage 518, the MCS can make a final determination on whether an operation of a pump as a supply device will be required as part of the supply compensating operation. Where a pump operation is necessary, the MCS may perform a pump operation check process 600. On the other hand, where a pump operation is not necessary, the MCS may control the non-pump supply device or devices in stage 520 according to the supply compensating operation.

More specifically, in stage 520, the MCS can operate a control valve, for example, to open a supply line and increase flow to the manifold. In another example, the MCS can operate a control valve to direct flow through a bypass so that a fluid throttle, fluid handling device, or other flow impeding device is circumvented and thereby increase a flow of fluid being supplied to the manifold.

Where it is determined that the estimated flowrate is not greater than the maximum total flow capacity in stage 514, at stage 522, the MCS can determine if a single valve operation (or operation of a single group of manifold valves serving a specified FHD or group of the same type of FHDs) may be implemented to obtain the target flow condition. This determination may be based on current flowrates through the bleed valve and the valve or valves serving the FHD with a new device setting. For example, the MCS can determine that an FHD-serving valve cannot increase a flowrate sufficiently only by moving to a full open operation because a maximum flowrate therethrough may be less than the flowrate required for the target flow condition. As such, at least one other valve (e.g., the bleed valve) may need to be operated in a closing direction to increase the maximum flowrate from the FHD-serving valve to a level that encompasses the required flowrate. As a result of this determination, the MCS can poll all of the valves and flow sensors for the manifold in stage 524, and identify the valve state (e.g., valve member positions) and flowrates for each valve of the manifold.

In one example, stage 524 can include the MCS accessing current required flowrates, actual flowrates, and permissible standard deviations from required flowrates, for each manifold valve. Further, the MCS may determine that slight position changes of valve members for non-FHD-serving valves may result in the flowrate corresponding to the target flow condition to be exhibited by the FHD-serving valve. In another example, the MCS may determine that only operations of the bleed valve and FHD-serving valve are needed, or are the only option, to bring about the target flow condition.

In addition, to make these determinations in stage 524, the MCS can take into account the total flow from the manifold that will be provided if all non-bleed valves provide respective required flowrates. This total flow will include a bleed valve portion of the total flow, and each non-FHD valve exhibiting a flowrate within a respective allowed standard deviation from a required flowrate. The MCS can then compare the flowrates for each valve in this total target flow condition-satisfying state, to the current state or position of each valve actuator or valve member for each valve and determine respective opening and closing operations to bring actual flowrates to individual valve flowrates for the target flow condition-satisfying state. Accordingly, at stage 526, the MCS can instruct the valve operation service to actuate the valves identified for operation in stage 524, in opening or closing operations determined.

In another example for stage 522, the MCS may determine that an operation of the valve or group of valves serving the FHD with a new device setting, such as a valve opening operation, is all that is needed to generate a flowrate from these valves that corresponds to the target flow condition. In this example, the MCS may determine a position of a valve member relative to a valve seat, such as the valve seat 219 of the manifold of FIG. 2, that will open or close a respective fluid chamber, such as one of the fluid chambers 211 in FIG. 2, to such a degree that a required flowrate through that valve will be exhibited. In another example, the MCS may determine that operation of just the bleed valve will be required to provide a flowrate from the valve or valves for the FHD to be obtained. In stage 530, the MCS, via the valve operation service and respective valve controllers, can operate FHD-serving valve or the bleed valve of the manifold according to the operation determined in stage 522.

Once the processes included in stage 520, or stage 526, or stage 530 have been completed, the MCS can again poll the flow sensor of the FHD-serving valve to determine if fluid from that valve is at a flowrate corresponding to, or otherwise exhibits, the target flow condition. In the case where the target flow condition is not observed, the MCS can again determine a flow differential in stage 510. This may occur in a situation where both a supply compensating operation and at least one valve operation is required to obtain the target flow condition. For example, a supply compensating operation is likely to be required in a situation where a maximum flowrate through the FHD-serving valve—with the FHD-serving valve fully open, the bleed valve fully closed, and all non-FHD and non-bleed valves respectively providing required flowrates—is insufficient to obtain the target flow condition. Thus, an overall increase in flow to the manifold will be required for the target flow condition, but also operations of the non-FHD valves will be required to maintain their respective required flowrates. For example, an increased input flowrate to the manifold may either require some operation of the bleed valve or closing operations of the non-FHD valves to remain within respective standard deviations of respective required flowrates.

Where it is determined in stage 534 that the target flow condition for the FHD-serving valve has been obtained and the flowrates from all other non-bleed valves of the manifold meet respective requirements, the MCS can perform a flow balancing operation in stage 540. In one example, stage 540 can include all of the operations, processes, determinations, and outputs performed or output as part of stage 444 as previously described.

Figure 6:
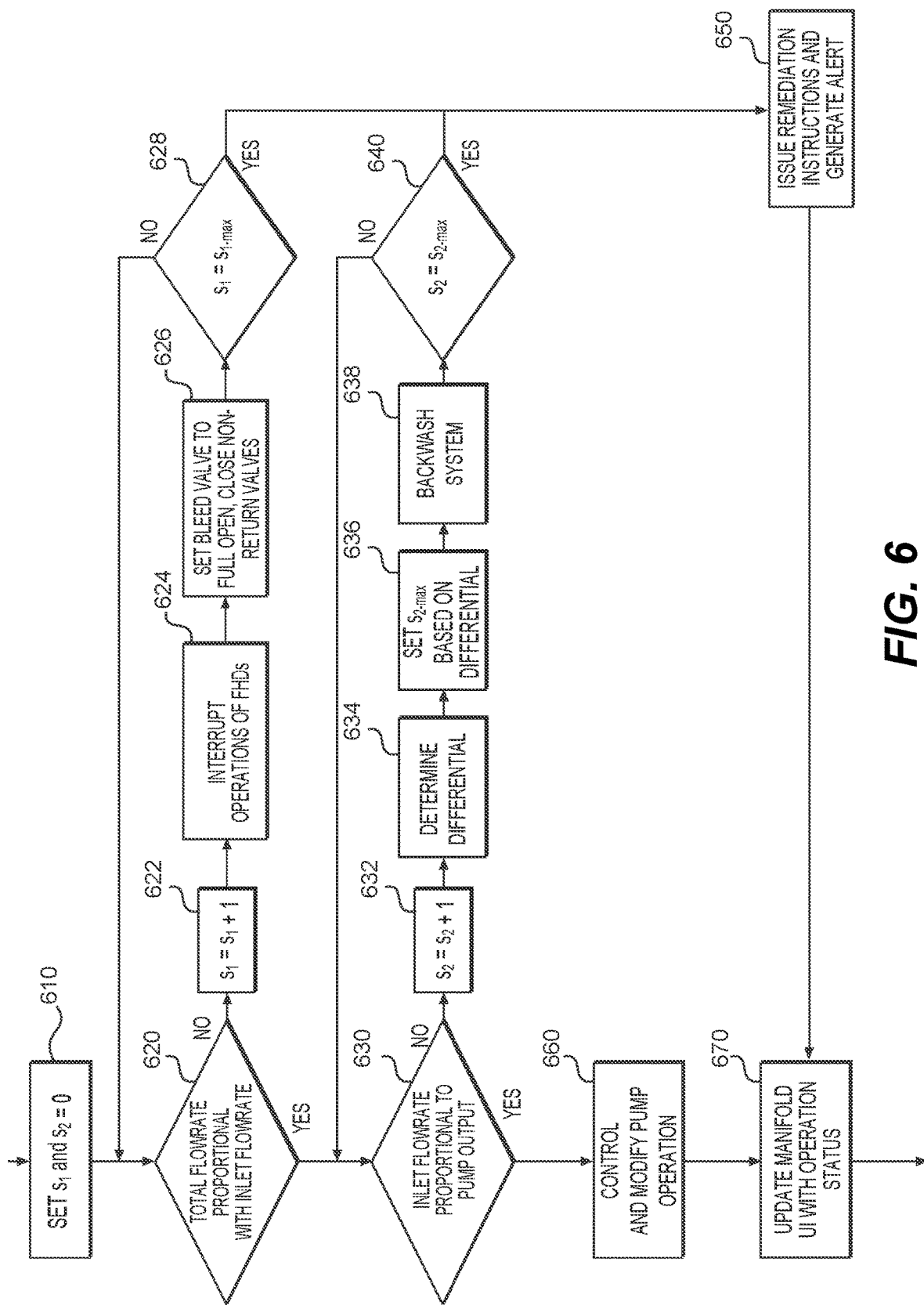
FIG. 6 illustrates an algorithmic flow chart of an example method for maintaining an operational capacity of a pump as a supply device using a manifold control system.

FIG. 6 illustrates an algorithmic flow chart of an example method for maintaining an operational capacity of a manifold and a pump using an MCS. More specifically, FIG. 6 illustrates an exemplary pump operation check process that may be implemented as part of the method of determining and implementing an operating sequence for manifold valves and supply device(s). At stage 610 the MCS processor, either directly or via the supply device operation service, can set first and second counters $s_1, s_2$ to zero. In stage 620, the MCS can determine if a total flowrate from the manifold is proportional with an inlet flowrate for the manifold. Stage 620 is in essence a check on the operational integrity of the manifold and may be necessary if particle or debris find there way into a chamber of the manifold, such as the first chamber 280 of the manifold 200.

At stage 622, where the total and inlet flowrates are not proportional, the MCS may increment the first counter $s_1$ by one (1) count and interrupt operations of the FHDs served by the manifold. In one example, where debris enters the manifold, one or more of the FHDs may not be receiving a sufficient volumetric flow and as a result, continued operation may result in damage to that FHD (e.g., an FHD that includes a motor driven pump may overheat if insufficient flow is supplied and a torque resistance on the motor is too low). As a result, the MCS can implement a service interruption to some or all of the FHDs. In one example, the MCS may access the flow sensors for each valve and be able to effectively pinpoint which valve may be obstructed. In this scenario, the MCS may only interrupt service (e.g., power) to the FHD served by that valve.

At stage 626, the MCS may set a bleed valve to full open, and close or partially close some or all of the non-bleed valves of the manifold. As a result of the lack of flow resistance for the bleed valve relative to the other valves, a majority fluid, and potentially any debris, may be directed to and potentially through the bleed valve.

At stage 628, the MCS will check the first counter $s_1$ versus a first counter threshold $s_{1-max}$. The first counter threshold $s_{1-max}$ can be set by a user or fluid distribution system administrator, or may be set by the MCS based on, for example, a number of FHDs served by the manifold. In any event, the first counter threshold $s_{1-max}$ may correspond to a count valve sufficient to allow for issue mitigation without risking damage to fluid distribution system components. In one example, the first counter threshold $s_{1-max}$ may correspond to a maximum safe running time without fluid supply for a component from all the components of the fluid distribution system having a smallest valve for such an operating parameter.

If the increased fluid flow through the bleed valve is sufficient enough to push the debris through the bleed valve, then the issue should be resolved. If the opposite is true, the bleed valve may be blocked and the MCS will cycle through stages 620 to 628 until the first counter is equal to the first counter threshold $s_{1\text{-}max}$. In recognizing this state, the MCS can generate and transmit issue remediation instructions and generate an alert in stage 650. In one example, the issue remediation instructions may be displayed with an alert on a user interface of the MCS and include directions to check the manifold for any blockages. In another example, the instructions can specify a particular outlet, channel, or FHD as a way to identify a particular valve that should be inspected. As will be discussed in relation to stage 640, the issue remediation and alert generation is not restricted to generating information about the manifold or to using the MCS as a means for conveying instruction and alert information.

Alternatively, the MCS may determine that the total flowrate is proportional to the inlet flowrate in stage 620. As a result, in stage 630, the MCS may determine if the inlet flowrate is proportional to a pump output flowrate (e.g., output GPM), in stage 630. In effect, this can be a check on whether there is any type of blockage between an inlet of the manifold and an outlet of a pump, or an outlet of another supply device as previously enumerated.

Where the MCS or the supply device operation service determines these flowrates are not equal or proportional in stage 630, the MCS may directly, or via the supply device operation service, increment the second counter $s_2$ by one (1) count. In one example, it may be determined that the two flowrates are proportional but not to an acceptable degree. Accordingly, the MCS or the supply device service can evaluate a degree of proportionality of the flowrates versus a reference degree in addition to determining if they are proportional generally.

Once the second counter $s_2$ is incremented in stage 632, a differential between the inlet flowrate and the pump output flowrate may be determined in stage 634. Based on the differential, the MCS can set a second counter threshold $s_{2\text{-}max}$ in stage 634. For example, for higher differentials (or disproportionalities), the second counter threshold $s_{2\text{-}max}$ may be set to a value within a range of lower values in recognition of the fact that what is causing the differential is significant and poses a substantial risk to the overall operations of the fluid distribution system.

Once the second counter threshold $s_{2\text{-}max}$ is set in stage 634, the MCS can control the pump to perform a backwash operation. In one example, the MCS can operate a series of control valves upstream and downstream of the pump in stage 638. The result being output flow of the pump is redirected from a main fluid circuit to a secondary circuit that just directs and cycles the fluid back to and through the pump.

In stage 640, the MCS can compare a current value of the second counter $s_2$ to a current value of the second counter threshold $s_{2\text{-}max}$. Similar to stage 628, if these two values are equal, the MCS can generate and transmit issue remediation instructions and generate an alert in stage 650. In one example, the issue remediation instructions may be displayed with the alert on a user interface of the pump, if one is provided, and the MCS. In addition, instructions to service the pump may be transmitted by the MCS to the pump for display, and/or be displayed on the user interface for the MCS.

Where 632 is determined to not be required, in stage 660, the MCS can control and modify a pump operation via the supply device operation service according to the supply compensating operation determined in stage 516. Upon completion of the pump operation in stage 660 or issuance of remediation instructions and alert generation in stage 650, the user interface of the manifold may be updated with an operation status of the manifold and/or the pump.

Figure 7:
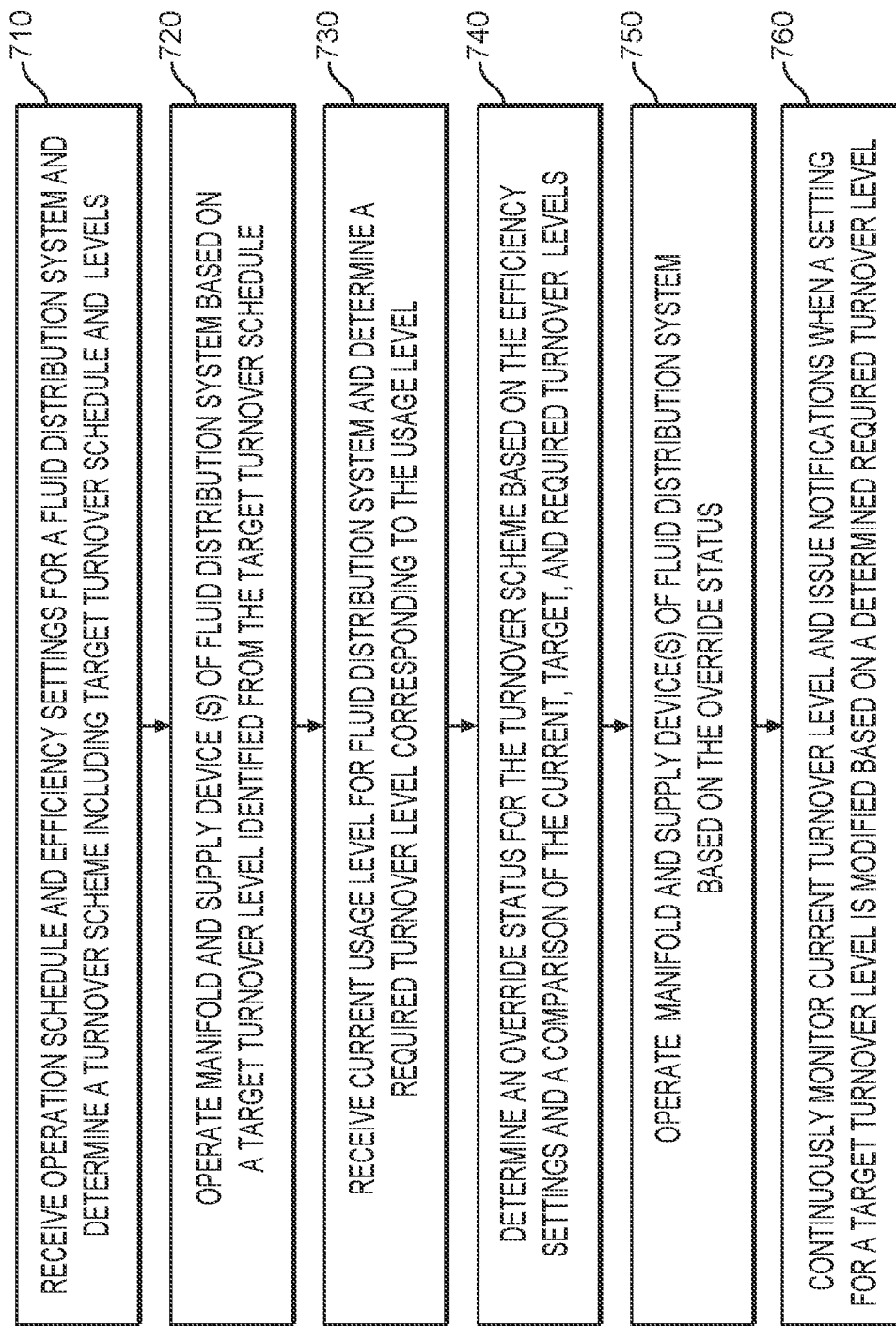
FIG. 7 is a flowchart for an example method for controlling operations of a fluid distribution system including a manifold based on a fluid system usage level.

FIG. 7 is a flowchart for an example method for controlling operations of a fluid distribution system including a manifold based on a fluid system usage level. At stage 710, an MCS for a manifold can receive a schedule and efficiency settings for operating a fluid distribution system according to the present disclosure. In one example, the efficiency settings can include a maximum power consumption for components of the fluid distribution system, runtime of certain components (e.g., certain supply devices such as a pump), cost of operations, peak usage times, volume of chemicals used, and other factors of the like. The MCS can receive either or both of the schedule and the efficiency settings from a user or fluid distribution system administrator via a user interface for the MCS, another component of the fluid distribution system (e.g., a user interface for a supply device), a fluid system manager device or service, or a user device.

In one example, the operation schedule may specify an estimated usage of the fluid distribution system. In another example, the estimated usage may include a schedule of user traffic that includes sub-periods of time (e.g., half, one, or two hour time periods) within a larger time period (e.g., a day, a week, a month, etc.), and an estimate of a number of users (e.g., pool-goers) that will be using a fluid distribution system, such as a pool, during those sub-periods.

Based on the schedule and efficiency settings, the MCS can determine a turnover scheme that includes a target turnover schedule of target turnover levels for the fluid in the fluid system. In one example, the target turnover level can correspond to a number of times that a specified total volume of fluid must be cycled through the fluid distribution system over a particular duration of time. The target turnover schedule can include start and end times for a cycle for which the MCS operates the components of the fluid distribution system, including the manifold, to achieve the target turnover level.

In one example, the total volume of fluid specified for any of the target turnover levels can correspond to a total, or a portion/percentage of a total, volume present in the fluid distribution system at any one moment in time (including connecting conduits). In another example, total volume for a target turnover level can correspond to a total volume of fluid in certain portions of the fluid distribution system, such as a pool, or a spa, or a pool and a spa. More generally, the total volume may be a volume of fluid that: (1) must be cycled through components or the fluid distribution system in its entirety; (2) over a specified duration of time; (3) in order to meet certain sanitary, performance, and/or regulatory requirements. In yet another example, the target turnover level may be distilled down by the MCS to a target flowrate through one or more valves of the manifold that serve to circulate fluid through certain components (e.g., a pool or a spa) of the fluid distribution system.

The MCS may prioritize the efficiency settings for determining the target turnover schedule and modifying a normal schedule of FHD operations. Accordingly, the schedule of overall operations for the fluid distribution system, including certain scheduled operations of particular FHDs, may be modified based on a determined target turnover level at a certain time in the target turnover schedule. In addition, when determined, the target turnover schedule can be influenced by a time of day, a number of individuals that have checked in to use the fluid distribution system, a maximum power consumption of fluid distribution system components, and other factors that affect a level of efficiency at which the fluid distribution system operates.

In stage 720 the MCS may operate the manifold and supply device or devices for the fluid distribution system based on a target turnover level as identified from the target turnover schedule determined in stage 710. In one example, the MCS can identify the target turnover level in the target turnover schedule corresponding to a current time. Further, the MCS can change the overall schedule of operations as modified through the processes performed in stage 710. In this stage, the MCS can operate the manifold and FHDs with the primary parameter of total fluid volume conveyed through the manifold over a running clock, as the primary controlling factor for operating the individual valves of the manifold.

At stage 730, the MCS may receive an indication of a current usage level of the fluid distribution system from, for example, a fluid system manager device or service. The MCS may process the current usage level and determine a required turnover level corresponding thereto. In one example, the current usage level can correspond to a number of people that have checked-in, for example at a front gate, to a pool or spa facility. From this, the MCS can estimate, roughly, how many people are in the pool or spa. The MCS can take this number and estimate, based on certain sanitation and/or regulatory standards and requirements with which the MCS may be programed, how many times a specified total volume (or a total volume of the subject fluid distribution system) must be turned over to meet those standards. In addition, the MCS can determine a schedule for delivering the required turnover level, based on the efficiency setting identified in stage 710. More specifically, the MCS can determine when and according to what speed (e.g., flowrate) fluid may be cycled through the fluid distribution system to meet energy consumption requirements corresponding to the efficiency setting, and still meet the turnover requirement needed for the current usage level.

In stage 740, the MCS can refer to the target and required turnover levels, determine a current turnover level from the flowrates detected by the flow sensors of the manifold, and compare these values. The MCS may first compare the required turnover level to the target turnover level to determine if the target turnover level needs to be adjusted. The target turnover level, if higher than the required turnover level, may dictate that the target turnover level remains in effect or is lowered. The MCS may determine if overriding the target turnover scheme by changing the target turnover level to the lower required turnover level may: save on power consumption; better meet efficiency settings at a current or future time; or actually decrease an ability to meet the efficiency settings because continuing to operate at a steady state better optimizes power consumption, turnover levels for a next scheduled turnover operation, or other factors.

Where the target turnover level is less than the required turnover level, the MCS will determine whether an override of just the target turnover schedule portion of the turnover scheme will satisfy current requirements. More specifically, the MCS may estimate whether a total turnover volume (total volume to be cycled×number of cycles) corresponding to the required turnover level may be satisfied by changing only start and/or end times within the target turnover schedule. The MCS may calculate what the total turnover volume will be for operating at a current or future scheduled target turnover level for a longer period of time (e.g., going to a later end time, starting at an earlier start time, etc.), and whether that will be sufficient. In the event a change to the target turnover schedule is insufficient, the MCS may, in one example, override just the target turnover level for a current portion of the target turnover schedule in overriding the target turnover scheme. In this example, the MCS may set the target turnover level to the required turnover level. In another example, the MCS may override the turnover scheme by changing multiple target turnover levels for multiple periods within the target turnover schedule based on the required turnover level. For example, the MCS may modify the target turnover levels for a current and future scheduled turnover operation as provided by the target turnover schedule based on a differential between the current target and required turnover levels, a period of time before the future scheduled turnover operation is going to be implemented, and the efficiency setting.

Also in stage 740, the MCS may display a notification with a respective user interface that the target turnover level has been modified.

Additionally, the MCS may register or otherwise store for reference purposes, the current turnover level in stage 740. Then in stage 750, the MCS may modify operations of the manifold valves and/or supply devices based on the override status of the turnover scheme, so that the current turnover level matches the new target turnover level. More specifically, in stage 750, the MCS may perform any of the methods described herein with respect to FIGS. 3 through 6, to enact manifold and supply device operations that result with flowrates from the manifold valves that result in the new target turnover level being exhibited in the fluid distribution system. In stage 760, the MCS may continuously monitor the current turnover level, and issue notifications when a setting for target turnover level is modified.

Figure 8:
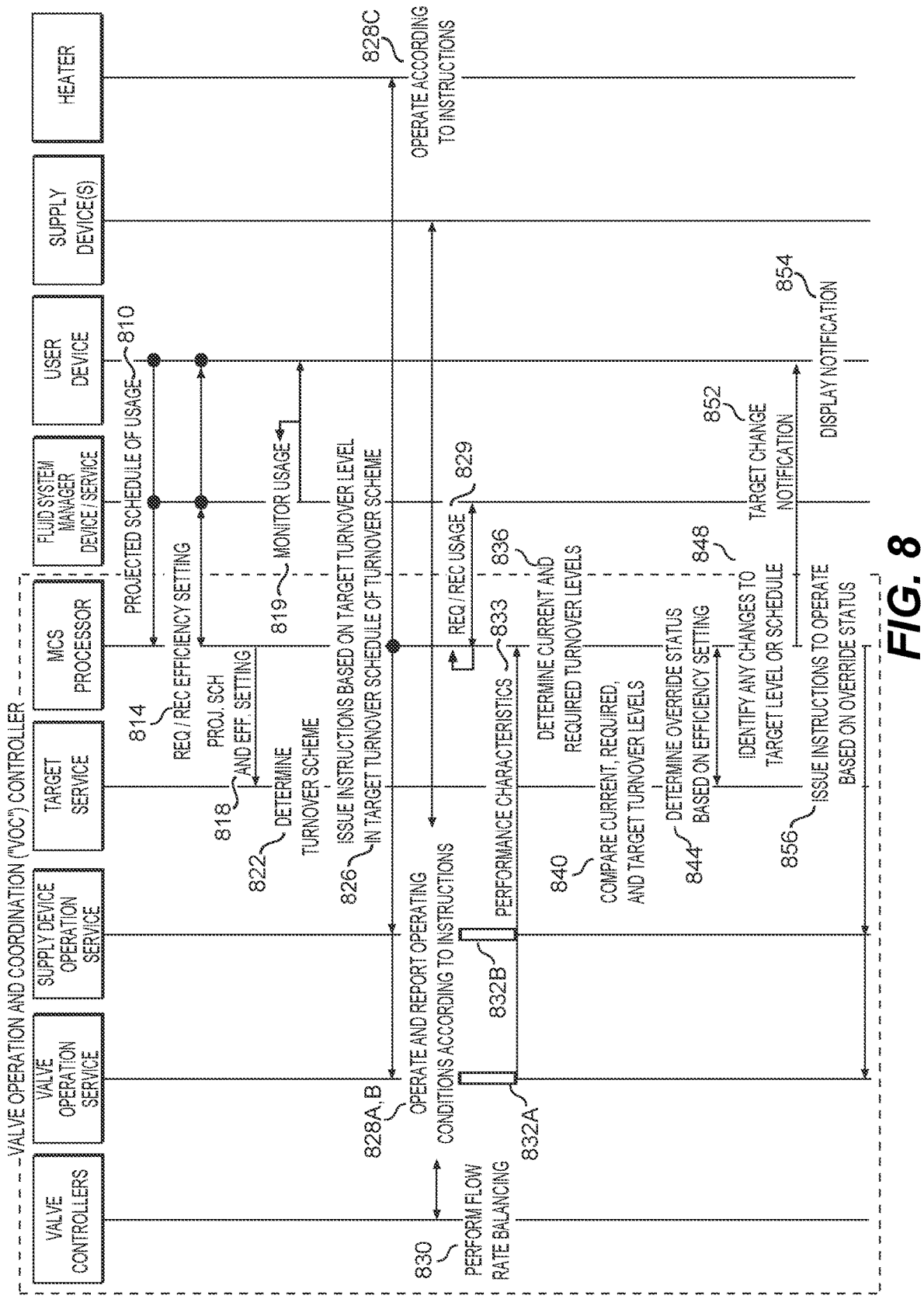
FIG. 8 is a sequence diagram of an example method for controlling total system fluid turnover operations for a fluid distribution system using an efficiency setting and a manifold.

FIG. 8 is a sequence diagram of an example method for controlling total system fluid turnover operations for a fluid distribution system using an efficiency setting and a manifold.

At stage 810, an MCS processor may receive a projected schedule of usage from the fluid system manager device or a user device operated by an individual responsible for maintenance and/or management of a fluid distribution system. In one example, the MCS processor can determine a projected schedule of usage based on historical records of usage, particularly in the case where usage is measured in number of people admitted to a facility in which the fluid distribution system is installed. In another example, a user of the user device or the fluid system manager device or service may enter a value of projected usage through a user interface of the device of service being used by the user.

In stage 814 the MCS processor can request and receive an efficiency setting from either or both of the fluid system manager and the user device. In one example, the MCS processor may be programmed to prioritize an efficiency setting from one source versus another. In another example, the MCS processor may assign different weights to multiple valves based on source and calculate a final efficiency setting by adjusting each efficiency setting value by a respective weighting criterion and combine the resulting values.

At stage 818, the MCS processor can transmit or otherwise provide a target service with the projected schedule of usage and the efficiency setting. With this information, the target service may determine a turnover scheme in stage 822. In one example, stage 822 can include the target service performing, making, or issuing all of the operations, processes, determinations, and outputs performed or output as part of stage 710.

In one example, the projected usage schedule may reflect a schedule of normal operations as referred to with respect to stage 710 of the method of FIG. 7. Further, the projected usage schedule may be derived from a schedule of operations supplied to the fluid system manager or the user device. In another example, the projected usage schedule may be a first projected usage schedule that is separate and independent of the schedule of operations for components of the fluid distribution system. In this example, the first projected usage schedule can be a representation of a user's estimation of fluid distribution system user traffic that may take place on a given day or over a given time period. The MCS processor can derive a second projected usage schedule from the schedule of normal operations for comparison with the first projected usage schedule. If the schedules differ by some predetermined degree, the MCS processor may send a message to a user interface of the fluid system manager or the user device requesting for information regarding a basis for the first projected usage. A user may enter a high or low temperature expected for the period of time in question, identify the current date as that of a holiday for which increased or decreased user traffic is expected, or any other factor that may inform the MCS processor as to whether or not the first or second projected usage schedule should take precedence over the other. In yet another example, the MCS processor may be programed to determine if a deviation between the two schedules is greater than a preset amount or deviation, and if so, to use the first projected schedule in those situations.

In stage 826, the MCS can issue instructions based on a target turnover level specified in the target turnover schedule of the turnover scheme determined in stage 822. Stage 826 may therefore be similar to and include all of the processes, operations, and methods described with respect to stage 720 for the method of FIG. 7. At stage 828A and 828B, valve and supply device operation services can process the instructions issued in stage 826, and respectively operate the valve controllers for the manifold and supply device(s) accordingly.

In some examples, the fluid distribution system may include a heater. In these examples where a usage metric is number of users, the efficiency setting may include maximum and minimum fluid temperatures. In the particular example where the fluid distribution system includes a pool or spa, the MCS processor may issue operating instructions to the heater in stage 826 based the efficiency setting and the number of users indicated by the projected usage from stage 818. As a result, the heater may operate according to the received instructions in stage 828C.

More specifically, the MCS processor may account for an impact user body heat has on a temperature of the fluid in the fluid distribution system by adding some temperature constant to an estimated temperature impact for every user that enters a facility. Accordingly, for certain usage levels, the MCS processor can recognize a minimum temperature specified by in the efficiency setting may be maintained with a reduced operation of the heater (e.g., the heater operating at a lower temperature, a shorter period of time, fewer operating cycles, shorter operating cycles, etc.), on account of an estimated combined affect user body heat will have on the fluid temperature. Similarly, the MCS may determine that reduce heater operation may be required to keep the fluid temperature below a maximum temperature specified by the efficiency setting.

As stages 810 to 828A, B, and C are performed, the fluid system manager device can continuously monitor usage of the fluid distribution system in stage 819. In stage 829, the MCS processor can request and receive a current usage as it is being continuously monitored with stage 819. The MCS processor may condition checking the usage level on issuing instructions in stage 826, or check according to a predetermined schedule.

As previously noted, usage can include a number of users at a facility in which the fluid distribution system is installed. In another example, the usage can be an average number of users over a period of time. In another example, usage can be an average chemical disbursement to chlorinate the fluid distribution system. In yet another example, the usage can correspond to average air temperature over predetermined amount of time. In other examples, the usage can be any measurement that corresponds to or dictates a volume of operations required by the fluid distribution system to perform an intended function or meet some level of sanitation or performance standard.

In one example, the usage can be monitored by either the fluid system manager or the user device and transmitted to the other of these two devices as a current usage is observed, registered, or recorded. In an example where usage corresponds to a number of users at a facility, either the fluid system manager or the user device may serve as or be in communication with a device that users interact with upon entry to the facility (e.g., a card reader, bar code reader, counter, etc.). In any of the configurations mentioned herein, usage of the fluid distribution system may be continuously monitored by either device, and available to the MCS by request or according to some predetermined reporting schedule enforced by the MCS processor of the MCS.

In other examples, the MCS processor can direct either device to provide the MCS with a current usage any time a value of the usage metric increases or decreases by a predefined magnitude over a predetermined period of time. For example, where the fluid distribution system includes an outdoor pool, and current conditions suddenly change from no rain to a heavy downpour, a mass exodus of users in a short period of time may occur, with each user checking out before leaving the facility. Accordingly, usage may drop drastically in a short period of time and therefore reduce a turnover level needed to maintain certain sanitary standards for the pool. As a result, if drop in usage is more than a predetermined threshold, the user device or fluid system manager device may be triggered to communicate the drop in usage to the MCS off schedule from a normal reporting schedule.

Once the valve operation service directs the operations of the valve controllers and the valve controllers operate in stage 828A, according to the instructions received in stage 826, the valve controllers 830 can continuously perform a flow balancing operation in stage 830. Similar to stages 350, 444, and 540, the valve controllers can operate valve actuators for the manifold to maintain respective determined, calculated, or otherwise specified fluid flowrates from each valve of the manifold.

Each of the valve and supply device operation services may be configured to observe a respective operating time 832A and 832B before accessing various sensors of the fluid distribution system that detect current values corresponding to parameters that reflect aspects of performance by the fluid distribution system and its individual components (e.g., flowrates, fluid volume, fluid consumption, duty cycles, flow resistance, etc.). The operating times 832A and 832B observed for the manifold and the supply device(s) may be different and correspond to amounts of time that the various devices normally take before reaching a steady state after new operating instructions are received.

The performance characteristics transmitted in stage 833 include values for at least those operating parameters required to determine current and required turnover levels as previously described (e.g., current flowrates, total volume conveyed over a period of time, fluid temperature, chlorination level, FHD operating schedules, etc.). At stage 836, the MCS processor determines the current and required turnover levels based on the performance characteristics received in stage 833.

In stages 840 and 844, the MCS processor and target service compare the current, required, and target turnover levels and determines turnover scheme override status as previously described for stage 740. Where a target turnover level or schedule is modified in stage 844, the change is identified by the MCS processor, which then issues a notification of the change to the user device in stage 854. At stage 856, the MCS processor issues instructions to valve and supply device operation services to operate based on the override status.

Figure 9:
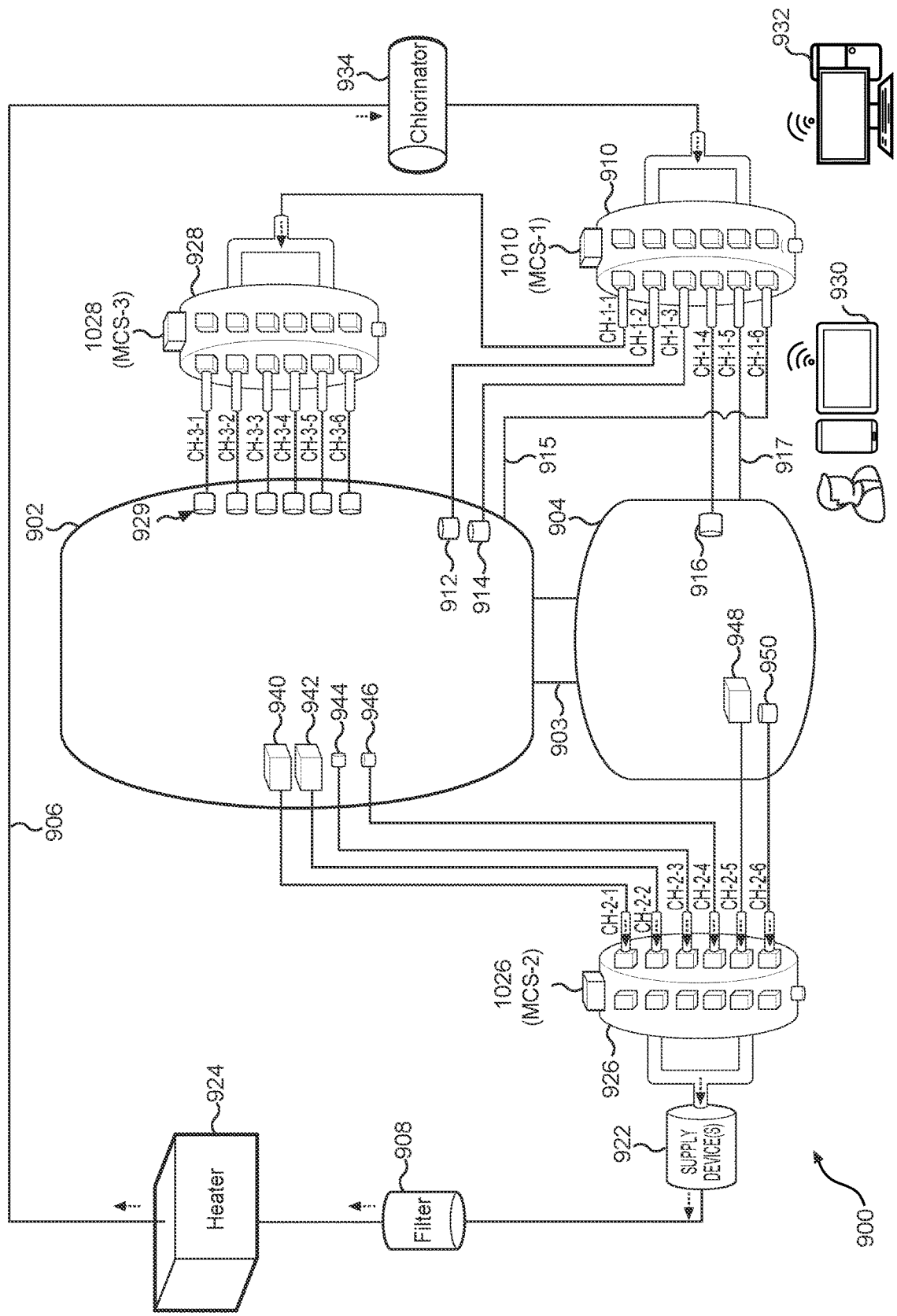
FIG. 9 illustrates an exemplary fluid distribution system including multiple manifolds, according to the present disclosure.

FIG. 9 illustrates an exemplary fluid distribution system 900 including multiple manifolds, according to the present disclosure. The fluid distribution system 900 includes a pool 902, a spa 904, and a fluid circulation line 906 that cycles fluid through the pool 902 and the spa 904. The spa 904 and the pool 902 may periodically be in fluid communication with one another through a spillway 903.

Installed on a suction side of the circulation line 906, is a supply device or devices ("supply device 922") that may include a pump, a control valve, a combination thereof, or another device previously described. In one example, the supply device 922 includes a supply device which pulls fluid from the pool 902 and spa 904 and conveys the fluid under positive pressure through a filter 908, a heater 924, a chlorinator 934, and a first manifold 910 installed in the in the circulation line 906. The supply device 922 may suck or received pressurized fluid from a second manifold 926 that is upstream of the supply device 922, but downstream of the pool 902 and the spa 904. The first manifold 910 is also in fluid communication with the pool 902 and the spa 904 on a pressure side thereof, as well as a third manifold 928 that operates primarily as a pool cleaner.

A first channel CH-1-1 of the first fluid manifold 910 connects to the third manifold 928, whereas second and third channels CH-1-2, 3, communicate with first and second water features 912, 914. A fourth channel CH-1-4 controllably supplies fluid to a spa jet 916, and fifth and sixth channels CH-1-5, 6 feed spa and pool return lines 917, 915 respectively.

Each of the channels CH-3-1 to 6 for the third manifold 928 are in fluid communication with a respective cleaning zone port 929 within the pool 902.

Turning to the second manifold 926, a main drain 940, skimmer 942, cleaner 944, and negative edge drain 946 for the pool 902 are in fluid communication with the first, second, third, and fourth channels CH-2-1 to 4 for the second manifold 926, respectively. A spa main drain 948 and a spa skimmer 950 are respectively in fluid communication with a fifth and a sixth channel CH-2-5 and 6 for the second manifold 926. Fluid within the pool 902 and the spa 904, under positive pressure owing to the operation(s) of the supply device 922, may circulate through various flow paths: (A) through the circulation line 906; (B) selectively move through the channels of the first manifold 910; (C) flow into the pool 902 and the spa 904: and (D) flow through the pool maintenance devices (940 to 946) and the spa maintenance devices (948 to 950), and into the second manifold 926. The flow paths may be established in accordance with different operation modes for the fluid distribution system 900, as implemented through operations of the first, second, and third manifolds 910, 926, 928.

As explained in more detail with reference to FIG. 10, a first manifold control system 1010 ("first MCS 1010" or "MCS-1") may communicate with one or both of a user device 930 and a fluid system manager device 932 and control the operation(s) of the supply device 922 and the heater 924. In addition, the first MCS 1010 can manage operations of the second and third manifolds 926, 928 by directing some or all of the operations of a second manifold control system 1026 ("second MCS 1026" or "MCS-2"), and a third manifold control system 1028 ("third MCS 1029" or "MCS-3"). Any of the first, second, and third MCSs 1010, 1026, 1028 may communicate through a wired or wireless connection, with the user device 930 or the fluid system manager device 932, to receive information regarding or instructions for managing the operations of the fluid distribution system 900.

Exemplary modes of operation for the fluid distribution system 900 can include first and second spa modes, as well as first and second pool modes. In the first spa mode, MCS-1 can operate its respective valves to close channels CH-1-1 and CH-1-4 to 1-6, and open channels CH-1-2 and 1-3. Fluid may flow through the circulation line 906 under pressure, for example by an operation of supply device(s) controlled by MCS-1, through the valves for CH-1-4 and 1-6 and to the spa jet 916 and the spa (via return line 917). At the same time, with no fluid supply from channels CH-1-1, MCS-3 may close all of its respective valves. At the same time, MCS-2 can operate respective valves to close channels CH-2-1 to 2-4, and open channels CH-2-5 and 2-6. Accordingly, fluid will flow from the spa main drain 948 and the spa skimmer 950, through the valves for channels CH-2-5 and 2-6, to the supply device(s) 922, and through the circulation line 906.

It will be noted that in the first spa mode, channels CH-1-3 to 1-5 to the pool 902 are closed, and channels CH-2-1 to 2-4 are closed, such that fluid is not being turned over. The MCS-1 may implement the first spa mode 1 as a result of an efficiency setting that establishes the pool should not be turned over during certain times of the day, for example at night, when the spa is more likely to be used.

A second spa mode could have the pool 902 and spa 904 in fluid communication through the spillway 903, and all of the valves for the first and second manifolds 910, 928 in the same state as in the first spa mode. However, in the second spa mode, the each of the valves of the third manifold 926 for channels CH-2-1 to 2-4 may be open, at least to some degree. Accordingly, fluid in the circulation line 906 will move through the first manifold 910 to the spa 904, into the pool 902 through the spillway 903, out of the pool 902 through the pool maintenance devices (940 to 946) and through the second manifold 926 via the valves for channels CH-2-1 to 2-4.

Turning to some exemplary pool modes, a first pool mode may have the MCS-1 close every respective channel except for channel CH-1-6 that serves the pool return line 915. In addition, the MCS-1 may direct MCS-2 to close all valves, and MCS-3 to open all valves serving the pool 902 (i.e., valves for CH-2-1 to 2-4) and close all valves serving the spa 904 (i.e., valves for CH-2-5 and 2-6).

In a second pool mode, valve states for the second manifold 926 may be the same as for the first pool mode, while MCS-1 closes every valve not serving a water feature 912, 914. In a third pool mode, MCS-2 may control or be directed to control its valves as in the first and second pool modes, and the MCS-1 may close all respective valves except the valve serving the third manifold 928. The third manifold 928 may in turn, open some or all of the channels served thereby (channels CH-3-1 to 3-6).

Figure 10:
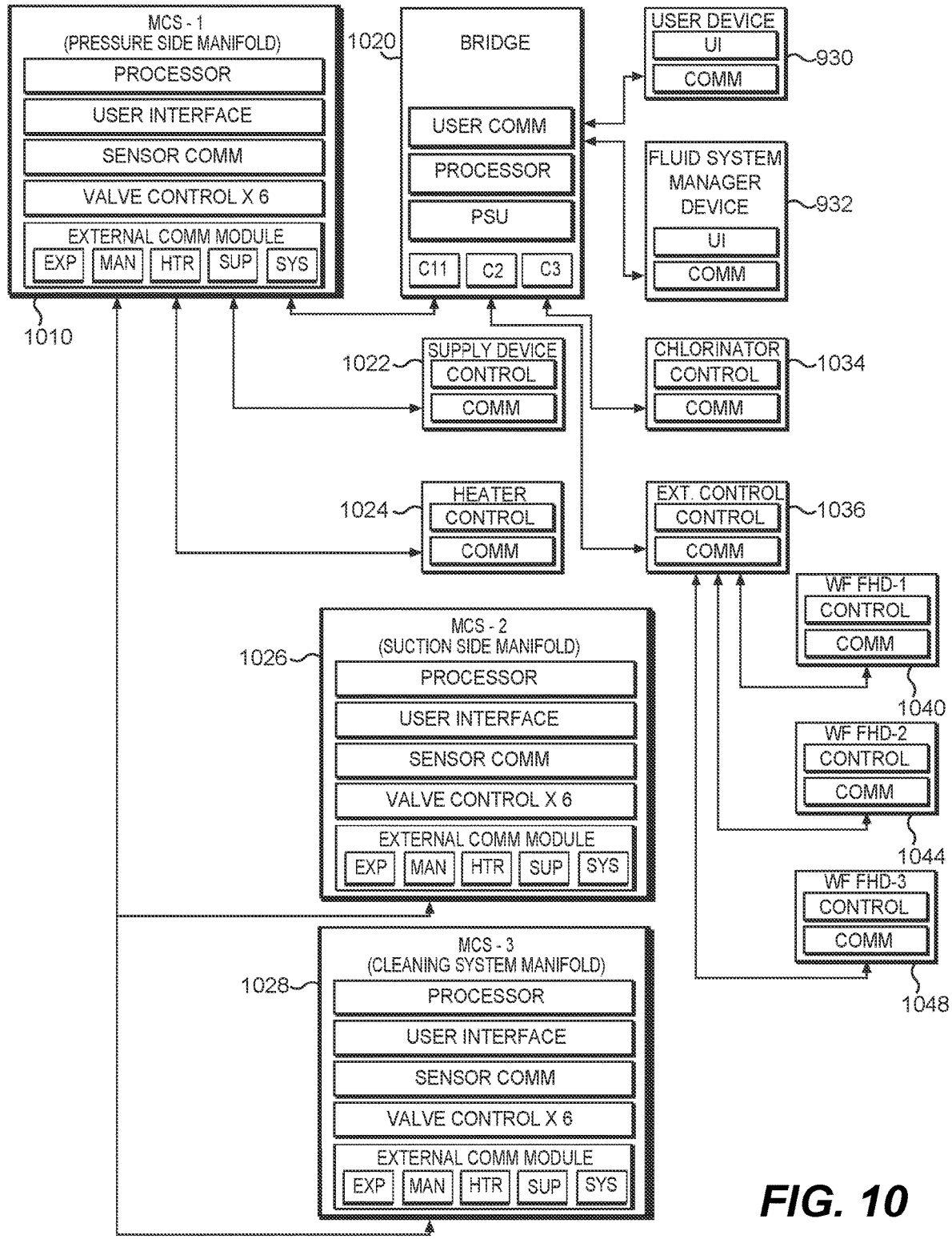
FIG. 10 illustrates exemplary system components for controlling operations of a fluid distribution system including multiple manifolds.

FIG. 10 illustrates exemplary system components for controlling operations of a fluid distribution system including multiple manifolds. In particular, MCS-1 may be configured to direct the operations of each of the fluid system components for the system 900 of FIG. 9. In particular, the MCS-1 includes connections, via manifold connection ports, to MCS-2 and MCS-3, such that these MCS(s) may be subordinate to MCS-1. In other examples, any of MCS-1, 2, or 3 can server as a "master" to the other MCS(s).

Heater and supply device ports for MCS-1 may be in communication with communication modules for supply device and heater controls 1022, 1024. In addition, a fluid system port for the MCS-1 may be in communication with a bridge 1020 so as to expand the group of devices that may be controlled by the MCS-1. In addition, the bridge 1020 can provide a communication and control bridge between the MCS-1 and the user device 930 and/or the fluid system manager device 932. The bridge 1020 can also expand a control capacity of the MCS-1 to include a chlorinator controller 1034 and an external controller 1036 that operatively communicates with several water features 1040, 1044, 1048. In one example, the bridge 1020 may be provided by a device including one or more WiFi-BLUETOOTH-BLE MCU modules, a PCB antenna, an external SPI flash, a SPI pseudo static RAM, and one or more CPU cores.

Figure 11:
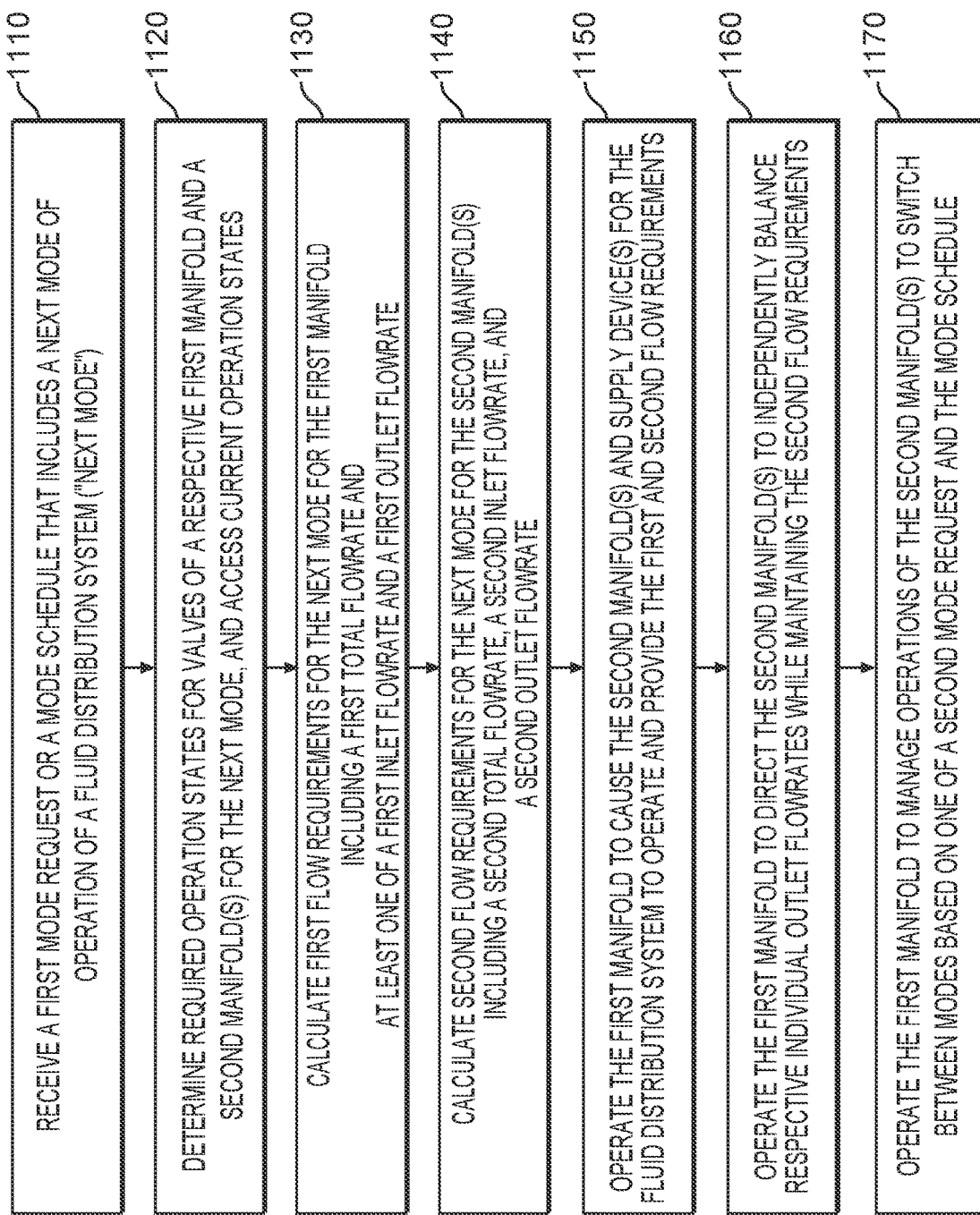
FIG. 11 is a flowchart for an example method for controlling operations of a fluid distribution system including multiple manifolds.

FIG. 11 is a flowchart for an example method for controlling operations of a fluid distribution system including multiple manifolds. At stage 1110, an MCS for a first manifold configured to control the operations of other manifolds installed in a fluid distribution system, can receive a first mode request or a mode schedule. The first mode request or the mode schedule may specify a next mode of operation for the fluid distribution system ("next mode"). In one example, the next mode can include system-wide operations and be inclusive of operations for all FHDs, valves, manifolds, and supply devices. In another example, the next mode may be limited to operations of devices installed in one portion of the fluid distribution, or perform a dedicated function (e.g., cleaning, spa only filtering, pool only cleaning, etc.) for a portion or an entirety of the fluid distribution system. In one example, the first mode request may correspond to a request for one of several spa modes, one of several pool modes, or one of several spa and pool combination modes.

In stage 1120, the MCS for the first manifold can determine first flow requirements for the next mode. In one example, calculating the first flow requirements can include determining a first total flowrate from the first manifold that is required for the next mode to be implemented. In another example, the first flow requirements calculated can include an inlet flowrate for the first manifold. For example, the first manifold may be downstream of a supply device that defines a transition from a suction side of the fluid distribution system to a pressure side. In this example, the inlet flowrate for the first manifold may be required in order to operate, or instruct the operation of, the supply device at a level that produces an outlet flowrate that provides a supply of fluid to the inlet of the first manifold exhibiting the inlet flowrate calculated in stage 1120.

In another example, the first manifold may include a valve-regulated outlet in communication with a channel connected to an inlet of another manifold. Accordingly, a determination of an outlet flowrate from that outlet may be required for the MCS of the first manifold to determine if a supply compensating operation is needed, or whether other valves for the first manifold can be operated so the subject outlet for stage 1120 exhibits the calculated outlet flowrate.

At stage 1130, the first manifold can determine second total flow requirements for one or more second manifolds that are subordinate to the first manifold (e.g., subordinate to operations of the first manifold and/or instructions issued to those manifolds by an MCS processor for the first manifold). In one example, the MCS for the first manifold can calculate a required total flowrate from the second manifold in stage 1130. In another example the second flow requirements may include, and be calculated by the first manifold, an inlet flowrate for the second manifold (or each second manifold), and an outlet flowrate. The outlet flowrate may be a flowrate for a single manifold valve of the second manifold. In another example, the outlet flowrate may be a combined flowrate for those outlets of the second manifold that are in communication with a particular FHD.

All of the flowrates calculated in stages 1120 and 1130 may be determined based on inlet flowrate requirements for supply devices, FHDs, and/or valves in communication with, or otherwise served by, the individual fluid channels which valves of the first manifold and second manifold(s) regulate. In addition, the flowrates calculated in stages 1120 and 1130 may take into account availability, capacity, and limitations of supply devices within the fluid distribution system. Thus, in one example, from this information, the first MCS processor for the first manifold may: (1) calculate each flowrate required from each of its valves; and (2) either calculate, or instruct second MCS processors for second manifolds to calculate and report to the first MCS processor, flowrates required from each of the valves of the second manifolds—based on the flowrate requirements for each FHD that the first manifold and each of the second manifold serves.

In stage 1140, the first MCS for the first manifold can determine required operation states for its respective valves as well as for manifold valves of one or more second manifolds that are subordinate to the first manifold. In one example, the first MCS can determine open and close statuses, generally, for each valve of each manifold. In another example, the operation states may include a series of operation states that one or more manifolds will have to cycle through (e.g., open, close, open) as part of its respective duties for the next mode.

As a more concrete example, reference is made to the fluid distribution system 900 of FIG. 9. Prior to implementing a second spa mode as a next mode, in an exemplary implementation of stage 1140, the MCS-1 may determine that based on a required total flowrate from the third manifold, each of the valves for the third manifold 928 are to be in an open state for the second spa/next mode. In another implementation of this second spa/next mode, the required total flow rate from the third manifold may be less, or the supply devices 922 may be supplying the first manifold 910 at an increased flowrate due to a downstream demand of a newly installed FHD that will be operated in the second spa mode. As a result, less than all of the cleaning devices may be required and one or more of the valves for the third manifold 928 may need to be closed in the next mode. This determination may be made by the MCS-1 in stage 1140.

In one example, the first manifold may remain the "master" of all the manifolds in the fluid distribution system for all operations modes. In other examples, any of the second manifolds may operate as the master of all other manifolds including the first manifold.

At stage 1150, the first MCS for the first manifold can access current operation states of the manifold valves of the first manifold and the second manifold(s), for the purposes of determining operating instructions to issue to its respective valve controllers and the MCS processors of the second manifold(s). In one example, the first MCS may compare current operation states to the required operation states determined in stage 1140, and determine whether to issue an opening or closing instruction for each manifold it controls directly or indirectly through a second MCS for the second manifold(s). In other examples, where current and required operation states for a given manifold valve are both an open state, the first MCS may compare a current flowrate and required flowrate for the next mode for that manifold valve, and issue an instruction according to a difference therebetween.

Also in stage 1150, the first MCS for the first manifold may operate the first manifold to cause the second manifold(s) and supply device(s) for the fluid distribution system to operate in the required operation states and provide the first and second flow requirements.

At stage 1160, the first manifold may be operated—an MCS processor of the first MCS may operate to issue instructions—to direct the second manifold(s) to independently balance respective individual outlet flowrates while maintaining the second flow requirements. In one example, the first manifold can issue an instruction to each second manifold to maintain a respective total output flowrate while continuously operating respective manifold valves in a balancing operation. In this example, this can consist of the valve controllers for the second manifold(s) continuously operating respective valve actuators to maintain or slightly modify respective valve openings as described in U.S. patent application Ser. Nos. 17/185,897 and 17/185,926, so that respective flowrates therethrough remain intact. In particular, as described in the applications listed above, valve controllers may continuously monitor and report respective flowrates, and operate actuators to make incremental adjustments to valve member positions, resulting in small changes to respective flowrates of fluid flowing therefrom, and maintain individual flowrates and a total flowrate from the second manifold(s) (e.g., at a target flow condition as provided to the second manifold(s) by the MCS for the first manifold).

In stage 1170, the first manifold may be operated to manage operations of the second manifold(s) to switch between modes based on one of a second mode request and a next mode specified in the mode schedule. In one example, stage 1170 may include the similar processes, inputs, outputs, and general operational features as stage 1110.

Figure 12:
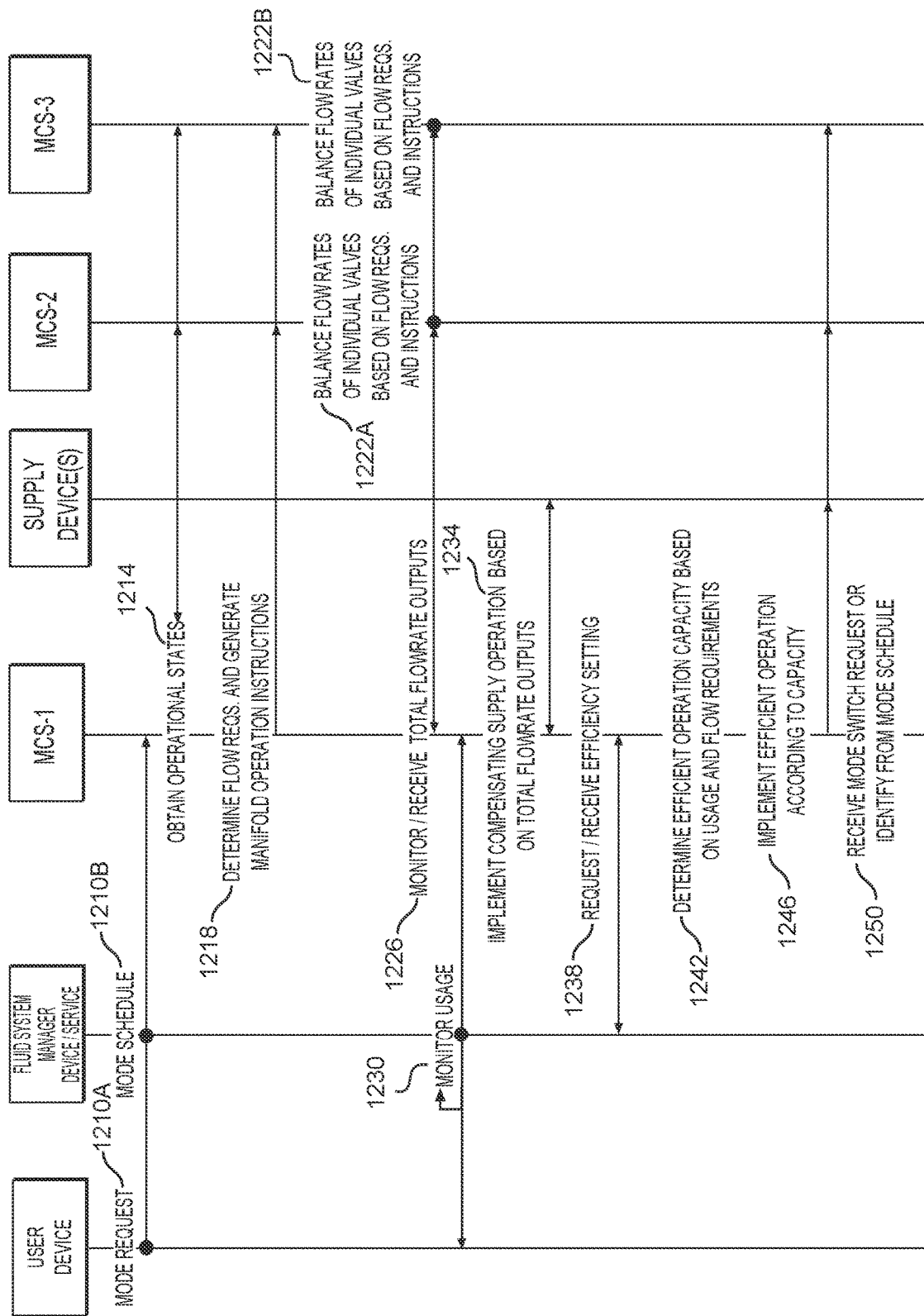
FIG. 12 is a sequence diagram of an example method for implementing and switching between different operational modes for a fluid distribution system.

FIG. 12 is a sequence diagram of an example method for implementing and switching between different operational modes for a fluid distribution system. An MCS for a master manifold ("MCS-1") can receive a mode request from a user device in stage 1210A and/or a mode schedule from a fluid system manager device or service in 1210B. In response to receiving the request, MCS-1 can poll the MCSs (MCS-2 and MCS-3) for all subordinate manifolds in stage 1214 and determine respective total flows from each and operational states of each valve thereof.

At stage 1218, MCS-1 can determine total flow requirements for each subordinate manifold, and flowrates required for each FHD for which an operation is required for a mode requested or scheduled in stage 1210A or 1210B, respectively. The MCS-1 can transmit these flow values to MCS-2 and MCS-3 in stage 1218. Then, in stage 1222A and 1222B, each MCS can operate valves of a respective manifold to deliver a flowrate required by each FHD that manifold serves as specified by MCS-1 in stage 1218. MCS-1 can tailor its instructions for each of MCS-2 and MCS-3 in stage 1218, or send the same instruction package to both. In the latter case, MCS-2 and MCS-3 may be configured to process portions of the instruction package applicable to the FHDs its respective manifold valves serve and a total flow that applies a manifold it is respectively incorporated therein.

At stages 1222A and 1222B the subordinate manifolds may be operated according to any of the methods described herein for obtaining a target flow condition and subsequent flow balancing. In addition, in stage 1226, each of MCS-2 and MCS-3 can report respective total flows and individual flowrates on request from MCS-1, or according to a reporting schedule. In addition, each can change the reporting schedule or send information to the MCS-1 upon recognition of an abnormal flow condition. For example, either MCS can execute the method of FIG. 6 and report the results of such a process, or issue instructions, or generate an alert, out of turn from a normal reporting schedule upon determining any such condition is being exhibited.

At stage 1230, the fluid system manager device or service can monitor a usage of the fluid distribution system. At stage 1234, MCS-1 can determine, and have the supply device(s) implement, a compensating supply operation for the total flow outputs of any one or all of the manifolds. In stage 1238, MCS-1 can request and receive an efficiency setting. Similar to the exemplary methods described with respect to FIGS. 7 and 8, the MCS-1 can determine a capacity for an efficient operation in stage 1242 and implement the efficient operation according that determined capacity at stage 1246.

At stage 1250, MCS-1 can receive a mode switch request or identify a next mode from the mode schedule, and re-initiate stages 1214 to 1248.

Figure 13:
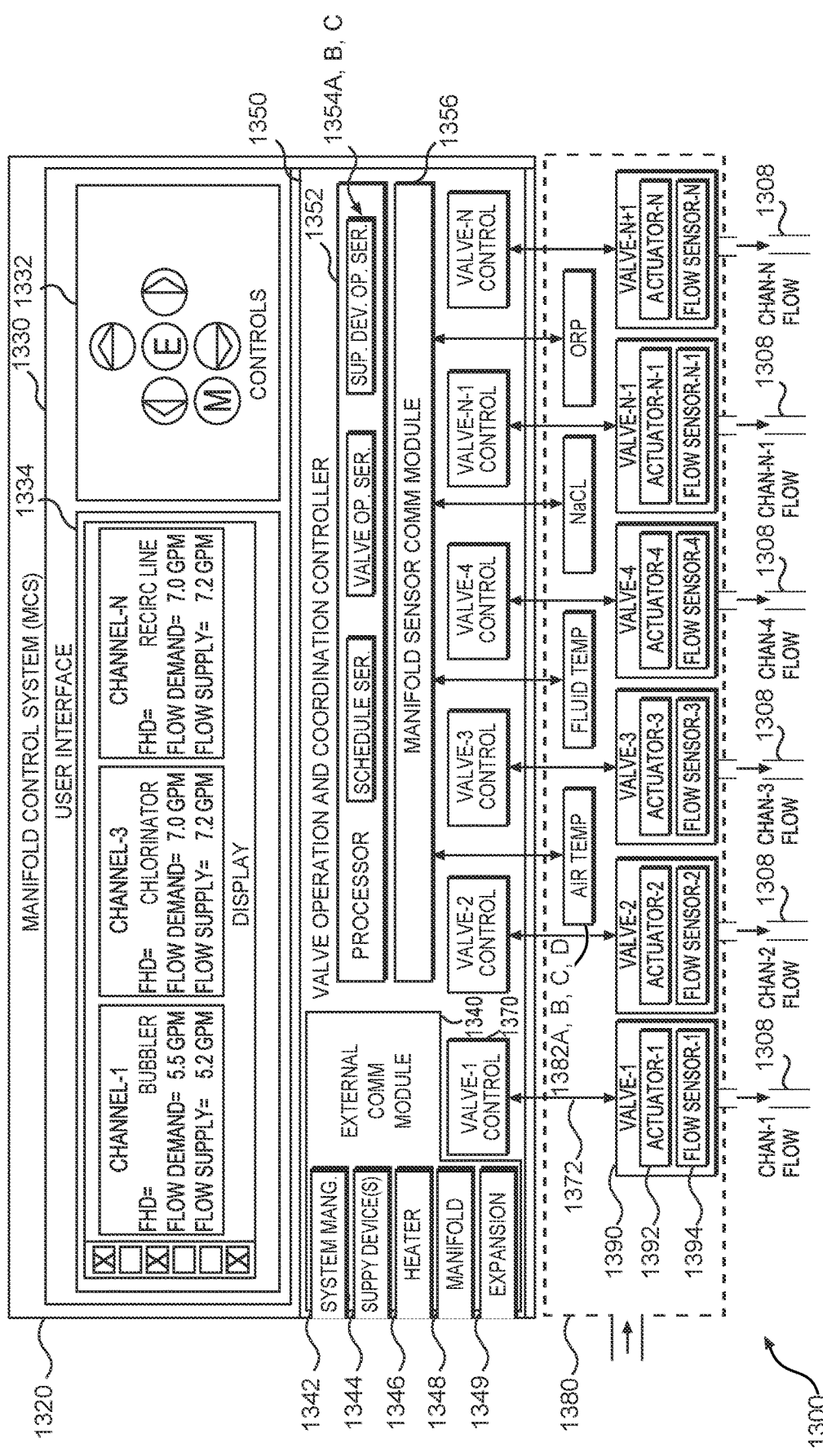
FIG. 13 illustrates a schematic view of a manifold control system and a manifold of a fluid distribution system, according to an aspect of the present disclosure.

FIG. 13 illustrates a schematic view of an exemplary manifold control system 1320 ("MCS 1320") of a manifold 1300 configured for a fluid distribution system, according to an aspect of the present disclosure. The manifold 1300 includes the MCS 1320 and a chamber 1380. The MCS 1320 includes a user interface 1330 and a valve operation and coordination controller 1350 ("VOC controller 1350).

The user interface 1330 is provided with a display 1334 and a set of controls 1332. For the display 1334, the user interface 1330 may include a liquid crystal display ("LCD") that provides a graphical interface, and a bus (e.g., I2C or SPI bus) connection to a processor. The controls 1332 may include push-buttons, for example six push buttons, and associated de-bounce hardware. The user interface 1330 may communicate (via, e.g., a processor for the user interface) with the VOC controller 1350 to convey control inputs from the controls 1332 and send and receive information.

In one example, the VOC controller 1350 includes at least one processor 1352, an external communications module 1340 ("ext-comm 1340"), a power input (not shown), and at least one valve controller 1370. It is through the ext-comm 1340 that the VOC controller 1350 receives control inputs that the VOC controller 1350 processes to determine and implement operations of valve assemblies 1390 installed in the chamber 1380 of the manifold 1300. The power input may be connected to a power source, the chamber 1380 may be in fluid communication with a supply device, and communication modules provided with various devices may communicate with the ext-comm 1340.

The processor 1352 can implement or otherwise have continuously executing thereon a plurality of services including a schedule service 1354A, a valve operation service 1354B, and a supply device operation service 1354C as described herein. The control inputs received through the ext-comm 1340 are used by the VOC controller 1350 to dynamically control: (A) flowrate to each of a plurality of flow channels 1308; and (B) a total flowrate of fluid to a combination of all the flow channels 1308. The ext-comm module 1340 can include a first connection terminal, port, or other type of connector 1342 ("first connection 1342") for communication with a fluid system manager device and/or service. In addition, a second connection 1344 for a supply device, a third connection 1346 for a heater, a fourth connection 1348 for a manifold other than the manifold 1300 operated by the MCS 1320, and a fifth connection 1349 for an additional device, may be incorporated in the MCS 1320.

The MCS 1320 can also include a manifold sensor comms module 1356 that interfaces with the processor 1352 and a group of fluid property sensors installed in the chamber 1380. This group of sensors can include an air temperature sensor 1382A, a fluid temperature sensor 1382B, a chlorine level (salt) sensor 1382C, and an ORP sensor 1382D, in some examples. Each sensor in the group may transmit data corresponding to respective quality to the manifold sensor comms module 1356, which can determine an order of priority for sending to the processor 1352, and send the data according to that order of priority. Alternatively, the processor 1352 may establish the order of priority which the manifold sensor comms module 1356 adheres to.

In general, the VOC controller 1350 will be equipped with processing power required to control the manifold 1300. In a specific example, the VOC controller 1350 may include a microchip ARM M0+ processor (e.g., an ATSAMC20) that is selected based on a number of different parameters including memory size (flash/RAM), timer support capabilities, actuator interface compatibility, number of general purpose Input/Outputs ("GPIOs"), low voltage operating capabilities, and other factors.

The ext-comm 1340 may be configured to communicate directly with a PSC panel, (not shown) the fluid distribution system 1300, or through the second comms module 606. In another example, either of the first or second comms modules 1340, 606 may be connected to an external control device (not shown), such as an external controller or a peripheral device (e.g., a phone, laptop, tablet, personal computer, a controller for an FHD, etc.) that serves as an intermediary between the MCS 1320 and external devices that may include heaters, pumps, other manifolds, chlorinators, water features, user devices, and the like. In another example, the ext-comm 1340 can communicate directly, or through another communication module with both of a PSC panel and an external control device.

As illustrated in FIG. 13, a valve controller 1370 is provided for, and may be included as a part of, each of the valve assemblies 1390. In other examples described herein, a single valve controller 1370 may be provided, or more generally, less valve controllers than a number of valve assemblies 1390 may be provided. Each of the valve controllers 1370 can include control interfaces for communicating and/or directing operations of an actuator 1392 and processing flow information from a flow sensor 1394, a power output (not shown), and a valve full-open, or full close, or full-open and full-close indicator (not shown).

Each control interface can provide a line of communication between a respective actuator 1392 and either the processor 1352 or a separate control manager (not shown) for a respective valve controller 1370. The valve controller 1370 can perform one or more processes to determine an instruction which it transmits to a respective actuator 1392 and causes the actuator 1392 to perform an operation specified in the instruction. In another example, an instruction may be generated at the level of the processor 1352, and the valve controller 1370, through a respective control interface, serves merely as a communication channel between the processor 1352 and a respective actuator 1392. Each actuator 1392 may be directly controlled by a dedicated control interface provided by a valve controller and reduce a processing burden on the processor 1352.

In one example, stepper motors may be provided for the actuators 1392, the valve controllers 1370 may include an integrated stepper motor controllers (e.g., a DRV8834, or the like) configured to issue enable, step, and direction signals to one or more stepper motors. In this example, the stepper motor controllers may be equipped with special hardware and have special hardware requirements for setup such that some operations may be hardwired on a printed circuit board ("PCB"). Such a PCB may be incorporated in the VOC controller 1370.

In some examples, the valve controller 1370 may process information from a respective flow sensor 1394 (e.g., a signal, a series of signals, a message, flag status, value of a measured parameter) for: display; translation and display; additional processing, translation, and display; or verification and display. In one example, the valve controller 1370 may provide a communication path between a respective flow sensor 1394 and the processor 1352, and the processor 1352 may determine a flowrate from the information provided by the valve controller 1370 which is based on the information received from the respective flow sensor 1394.

In another example, the valve controller may primarily, or additionally, provide a first flow monitoring component, such as a Hall effect device, that is incorporated in a bus that is attached to the chamber 1380. Accordingly, the Hall effect device may be communicatively attached to a flow measuring device, such as a magnet equipped impeller. In addition, the valve controller 1370 may include hardware that interfaces these Hall effect signals to a respective valve controller 1370 and/or the processor 1352. The flow measuring device mentioned above may encompass primarily, or in part, a flow sensor 1394, and be provided inside an outlet port of the manifold 1300. With the outlet port being in fluid communication with a flow channel, the flow sensor 1394 may generate two pulses per rotation of the impeller of the flow sensor 1394 and thereby provide data that may be used to determine and indicate a flowrate of fluid passing through the outlet port.

A power output (not shown) for each valve controller 1370 may be connected, and supply power to a respective valve assembly 1390 and its actuator 1392 and flow sensor 1394. Each of the power outputs can draw from a connection to a power supply provided by the power input (not shown) for the MCS 1320. In one example, this power input may provide a 24 VAC supply that will be utilized to provide all the power requirements for the manifold 1300. Hardware that may be incorporated in the manifold 1300 may handle/require/output 5V signals and manage power requirements for all devices including the valve controllers 1370.

In one example, a 5V signal or other voltage power signal from the MCS 1320 may be supplied to a respective valve assembly 1390. Accordingly, all valve assemblies 1390 provided in the chamber 1380 may be powered through the connection between a power input for the MCS 1320 and a power source connected thereto.

Each valve controller 1370 may include a full-open/full-close indicator that may be configured to detect or otherwise operate as a way of indicating that an actuator 1392 (or valve member) is located in a home position and a respective valve assembly 1390 is in a fully open or fully closed state. For example, each valve controller 1370 may include a home momentary contact switch that may be used to define, to either a respective valve controller 1370 or the processor 1352, a fully open position for a respective valve assembly 1390, and can be considered as a limit switch for an open flow channel.

As described herein, a home position may correspond to a position of an actuator and valve member that corresponds to a fully open or a fully closed state for a valve assembly 1390. In one example, open/close indicators may be monitored by a respective valve controller 1370, and/or by the processor 1352. Recognition of these operational conditions (fully open or fully closed) may be used as a way to determine that: (1) other valve assemblies may have to be operated to achieve a desired flowrate through a particular valve assembly that is fully open; or (2) other valve assemblies may have to be operated to achieve a desire flowrate through a select valve assembly since the fully closed valve assembly cannot further have an increasing affect to the flowrate of fluid entering another valve assembly in a manifold.

Figure 15:
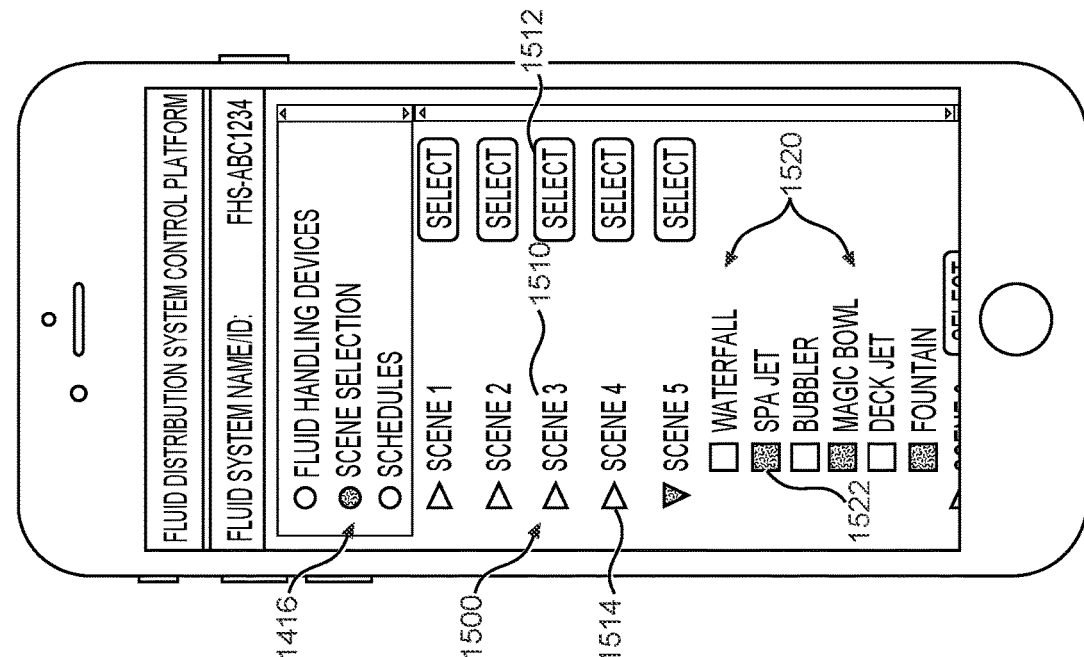
FIGS. 14 and 15 illustrate exemplary screens for an example graphical user interface ("GUI") of a user device used to perform the various methods described herein.
Figure 14:
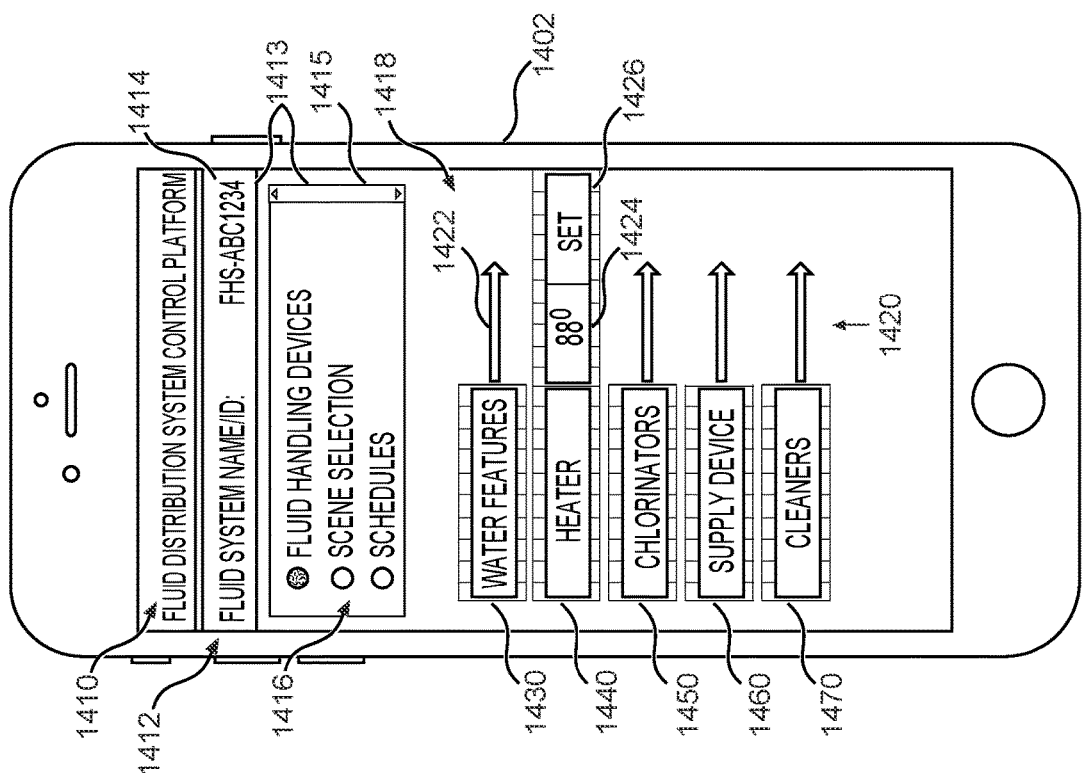

FIGS. 14 and 15 illustrate exemplary screens for an example graphical user interface ("GUI") 1412 for a fluid distribution system control platform 1410 ("platform 1400") implemented on a user device 1402 used to perform the various methods described herein.

As shown, GUI 1412, may be implemented by and displayed on the user device 1402, in this case a cellular phone, but could be displayed on other computing devices (e.g., a tablet, laptop, etc.). A first section 1413 of the GUI 1412 can display system or facility ID value 1414 ("ID value 1414") in a system ID field, the ID value 1414 corresponding to a location and facility with a fluid distribution system that may be controlled through the user device 1402. In one example, this fluid distribution system ("FHS-ABC1234") will incorporate at least one manifold according to the present disclosure. A navigation section 1415 of the first section 1413 allows a user to navigate between operation category options 1416 that if selected, can show fluid handling devices, available scenes, and operation schedules established for the fluid distribution system corresponding to the ID value 1414 in the system ID field.

In the example illustrated in FIG. 14, a fluid handling device option has been selected for the fluid system corresponding to the ID value 1414 displayed in the system ID field in the first section 1413. Selection of this option causes the platform 1410 to display representations of the fluid handling devices incorporated with the fluid distribution system corresponding to the ID value 1414. In the illustrated example, in a second section 1418 of the GUI 1412 of the platform 1410, categories for FHDs incorporated in the system are listed and include water features 1430, a heater 1440, chlorinators 1450, a supply device 1460, and pool cleaners 1470.

A current status section 1420 of the second section 1418 of the GUI 1412 includes expand options 1422, current condition displays 1424, and modification options 1426—depending on a number of FHDs for a category being represented in the platform 1410. For example, the fluid distribution system having the ID value of "FHS-ABC1234," incorporates multiple water features but has only one heater. As a result, a current fluid temperature of fluid flowing through the fluid distribution system, which may be affected by the heater represented in the heater category 1440, is indicated in the condition display 1424 for the heater. In addition, a modification option 1426 is also displayed. In one example, selection of this option may cause an up/down interface to be displayed, which may be manipulated to modify a setting which a user can choose for the heater to cause the fluid in the system to exhibit.

Turning to FIG. 15, a scene option is selected for the operation category option 1416 and a scene selection interface 1500 is displayed in the second section 1418 of the GUI 1412 on the user device 1402. The scene selection interface 1500 includes a list of scenes 1510, each of which may be selected for implementation through a respective selection option 1512 which is displayed. Should a user wish to know more about a particular scene, an expand option 1514 may be selected for that that scene, and a list of water features 1520 may be displayed. The list of water features 1520 may provide participant indicators 1522 that denote which water feature is included in a particular scene for a respective expand option 1514 that has been selected.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps may be executed or performed in any suitable fashion. Moreover, the various features of the examples described here are not mutually exclusive. Rather any feature of any example described here may be incorporated into any other suitable example. It is intended that the specification and examples be considered as exemplary only, with a true scope and spirit of the disclosure being indicated by the following claims.

What is claimed is:

1. A method for controlling operations of a fluid distribution system including multiple manifolds, the method comprising:
   receiving, with a first processor of a first manifold, a first mode request or a mode schedule including a next mode of operation for the fluid distribution system ("next mode");
   calculating first flow requirements for the next mode for the first manifold based at least in part on a flowrate required by at least one first pool or spa fluid handling device in fluidic communication with the first manifold, the first flow requirements including a first total flowrate from the first manifold;
   calculating second flow requirements for the next mode for a second manifold based at least in part on a flowrate required by at least one second pool or spa fluid handling device in fluidic communication with the second manifold, the second flow requirements including a second total flowrate from the second manifold;
   determining required operation states for valves of the first manifold and the second manifold for the next mode based on the first and second flow requirements;
   operating, with the first processor, the first manifold to cause the second manifold and a supply device of the fluid distribution system to operate in the required operation states and provide the first and second flow requirements; and
   directing, with at least one of the first processor and a second processor of the second manifold, the second manifold to:
   register respective outlet flowrates for individual outlets of the second manifold detected by flow sensing components for the fluid distribution system; and operate at least one of the valves of the second manifold to balance outlet flows from the individual outlets based on detected values for the respective outlet flowrates and the second flow requirements.

2. The method of claim 1, further comprising operating, with the first processor, the first manifold to direct the second manifold to independently balance each of the respective outlet flowrates for the individual outlets of the second manifold while continuing to provide the second flow requirements.

3. The method of claim 1, further comprising managing, with the first processor, operations of the second manifold to switch between operation modes based on one of the mode schedule and the processor receiving a second mode request.

4. The method of claim 1, wherein the first flow requirements include at least one of an inlet flowrate and an outlet flowrate for the first manifold.

5. The method of claim 4, wherein a first valve of the first manifold is in fluid communication with an inlet of the second manifold, wherein the first flow requirements include the outlet flowrate for the first manifold, wherein the outlet flowrate is a first outlet flowrate for the first valve, and wherein calculating the first flow requirements includes calculating a value for the first outlet flowrate sufficient to provide the second total flowrate.

6. The method of claim 1, wherein the second flow requirements include an inlet flowrate and an outlet flowrate for the second manifold.

7. The method of claim 1, wherein operating the first manifold to cause the second manifold to operate in the required operation state comprises:
accessing, with the first processor, current operation states of the valves of the second manifold;
determining an operating direction and required flowrate for each valve of the second manifold; and
transmitting the operating directions and required flowrates to a second processor of the second manifold.

8. A non-transitory, computer-readable medium containing instructions that, when executed by a hardware-based processor, performs stages for controlling operations of a fluid distribution system including multiple manifolds, the stages comprising:
receiving, with a first processor of a first manifold, a first mode request or a mode schedule including a next mode of operation for the fluid distribution system ("next mode");
calculating first flow requirements for the next mode for the first manifold based at least in part on a flowrate required by at least one first pol or spa fluid handling device in fluidic communication with the first manifold, the first flow requirements including a first total flowrate from the first manifold;
calculating second flow requirements for the next mode for a second manifold based at least in part on a flowrate required by at least one second pol or spa fluid handling device in fluidic communication with the second manifold, the second flow requirements including a second total flowrate from the second manifold;
determining required operation states for valves of the first manifold and the second manifold for the next mode based on the first and second flow requirements;
operating, with the first processor, the first manifold to cause the second manifold and a supply device of the fluid distribution system to operate in the required operation states and provide the first and second flow requirements; and directing, with at least one of the first processor and a second processor of the second manifold, the second manifold to:
register respective outlet flowrates for individual outlets of the second manifold detected by flow sensing components for the fluid distribution system; and
operate at least one of the valves of the second manifold to balance outlet flows from the individual outlets based on detected values for the respective outlet flowrates and the second flow requirements.

9. The non-transitory, computer-readable medium of claim 8, the stages further comprising operating, with the first processor, the first manifold to direct the second manifold to independently balance each of the respective outlet flowrates for the individual outlets of the second manifold while continuing to provide the second flow requirements.

10. The non-transitory, computer-readable medium of claim 8, the stages further comprising managing, with the first processor, operations of the second manifold to switch between operation modes based on one of the mode schedule and the processor receiving a second mode request.

11. The non-transitory, computer-readable medium of claim 8, wherein the first flow requirements include at least one of an inlet flowrate and an outlet flowrate for the first manifold.

12. The non-transitory, computer-readable medium of claim 8, wherein a first valve of the first manifold is in fluid communication with an inlet of the second manifold, wherein the first flow requirements include the outlet flowrate for the first manifold, wherein the outlet flowrate is a first outlet flowrate for the first valve, and wherein calculating the first flow requirements includes calculating a value for the first outlet flowrate sufficient to provide the second total flowrate.

13. The non-transitory, computer-readable medium of claim 8, wherein the second flow requirements include an inlet flowrate and an outlet flowrate for the second manifold.

14. The non-transitory, computer-readable medium of claim 8, the stage of operating the first manifold to cause the second manifold to operate in the required operation state comprising:
accessing, with the first processor, current operation states of the valves of the second manifold;
determining an operating direction and required flowrate for each valve of the second manifold; and
transmitting the operating directions and required flowrates to a second processor of the second manifold.

15. A fluid distribution system, comprising:
a supply device;
a first manifold including a first memory storage and including a first computing device, the first memory storage including a first non-transitory, computer-readable medium comprising first instructions, the first computing device including a first hardware-based processor; and
a second manifold including a second memory storage and a second computing device, the second memory storage including a second non-transitory, computer-readable medium comprising second instructions, the second computing device including a second hardware-based processor,
wherein at least the first hardware-based processor executes the first instructions to carry out stages comprising:
receiving a first mode request or a mode schedule including a next mode of operation for the fluid distribution system ("next mode"), calculating first flow requirements for the next mode for the first manifold based at least in part on a flowrate required by at least one first pool or spa fluid handling device in fluidic communication with the first manifold, the first flow requirements including a first total flowrate from the first manifold, calculating second flow requirements for the next mode for the second manifold based at least in part on a flowrate required by at least one second pool or spa fluid handling device in fluidic communication with the second manifold, the second flow requirements including a second total flowrate from the second manifold, determining required operation states for valves of the first manifold and the second manifold for the next mode based on the first and second flow requirements, and operating the first manifold to cause the second manifold and a supply device of the fluid distribution system to operate in the required operation states and provide the first and second flow requirements; and wherein at least one of the first hardware-based processor and the second hardware-based processor carries out a stage including directing the second manifold to:

register respective outlet flowrates for individual outlets of the second manifold detected by flowing sensing components for the fluid distribution system, and operate at least one of the valves of the second manifold to balance outlet flows from the individual outlets based on detected values for the respective outlet flowrates and the second flow requirements.

16. The system of claim 15, wherein the first hardware-based processor executes the first instructions to carry out stages further comprising operating the first manifold to direct the second manifold to independently balance each of the respective outlet flowrates for the individual outlets of the second manifold while continuing to provide the second flow requirements.

17. The system of claim 15, wherein the first hardware-based processor executes the first instructions to carry out stages further comprising managing operations of the second manifold to switch between operation modes based on one of the mode schedule and receiving a second mode request.

18. The system of claim 15, wherein the first flow requirements include at least one of an inlet flowrate and an outlet flowrate for the first manifold.

19. The system of claim 18, wherein a first valve of the first manifold is in fluid communication with an inlet of the second manifold, wherein the first flow requirements include the outlet flowrate for the first manifold, wherein the outlet flowrate is a first outlet flowrate for the first valve, and wherein calculating the first flow requirements includes calculating a value for the first outlet flowrate sufficient to provide the second total flowrate.

20. The system of claim 15, wherein operating the first manifold to cause the second manifold to operate in the required operation state comprises the first processor:

accessing, with the first processor, current operation states of the valves of the second manifold, determining an operating direction and required flowrate for each valve of the second manifold, and transmitting the operating directions and required flowrates to a second processor of the second manifold.

* * * * *